United States Patent
Resnick et al.

(10) Patent No.: US 12,201,123 B2
(45) Date of Patent: Jan. 21, 2025

(54) INGREDIENT BLENDING SYSTEM AND METHOD

(71) Applicant: Forte Supply LLC, Loveland, CO (US)

(72) Inventors: Jeffrey D. Resnick, Dallas, TX (US); Tyler Hawker, Timnath, CO (US); Luke Wallace, Denver, CO (US)

(73) Assignee: Forte Supply LLC, Loveland, CO (US)

( * ) Notice: Subject to any disclaimer, the term of this patent is extended or adjusted under 35 U.S.C. 154(b) by 248 days.

(21) Appl. No.: 17/899,812

(22) Filed: Aug. 31, 2022

(65) Prior Publication Data
US 2024/0065288 A1 Feb. 29, 2024

(51) Int. Cl.
| A23G 9/16 | (2006.01) |
| A23G 9/22 | (2006.01) |
| B01F 33/84 | (2022.01) |
| B01F 101/13 | (2022.01) |

(52) U.S. Cl.
CPC .............. *A23G 9/166* (2013.01); *A23G 9/228* (2013.01); *B01F 33/84* (2022.01); *B01F 2101/13* (2022.01)

(58) Field of Classification Search
CPC .......... A23G 9/166; A23G 9/228; A23G 9/22; A23G 9/28; B01F 2101/13
See application file for complete search history.

(56) References Cited

U.S. PATENT DOCUMENTS

2022/0183499 A1* 6/2022 Brothers .............. B67D 1/0037

\* cited by examiner

*Primary Examiner* — Lionel Nouketcha
(74) *Attorney, Agent, or Firm* — H. Brock Kolls

(57) ABSTRACT

The present invention relates to an ingredient blending system and method for use in frozen beverage equipment and soft-serve ice cream equipment. In an exemplary embodiment, a manifold body has at least one blending chamber, more than one ingredient inlet port, more than one pressure reservoir, more than one ingredient egress port that intersects the pressure reservoir, and more than one ingredient ingress port that intersects the blending chamber. More than one inlet conduit is fastened to each of the ingredient inlet ports, more than one pressure sensor is secured within each of the pressure reservoirs, and more than one electronic valve is secured to the manifold body. In accordance with a recipe pulse sequence, the ingredients are blended in the blending chamber forming a food product, and injected into the mixing cylinder where the food product is chilled and dispensed to a customer for consumption.

20 Claims, 14 Drawing Sheets

US 12,201,123 B2

INGREDIENT BLENDING SYSTEM AND METHOD

TECHNICAL FIELD OF THE INVENTION

This invention relates to an ingredient blending system and method for use in frozen beverage equipment and soft-serve ice cream equipment, and particularly to an ingredient blending manifold having a blending chamber, wherein one or more ingredients are blended to form a food product. The food product is injected into a mixing cylinder where it is chilled and dispensed to a customer for consumption.

BACKGROUND OF THE INVENTION

Before our invention, it was common to connect various ingredient supply lines to a mixing cylinder. The ingredients were injected in various ratios and the combination was stirred with an agitator to mix the ingredients. Shortcomings of this approach were that the ingredients took time to thoroughly blend and in applications where products were quickly dispensed from the mixing cylinder for consumption it was not uncommon for a customer to receive a poorly mixed product.

Another shortcoming is that often product variations required different ingredients to be mixed to form different food products. As such, it is difficult to connect numerous ingredient supply lines to a mixing cylinder and in equipment having multiple mixing cylinders the problem is other multiplied.

Another shortcoming is that in systems that do attempt to use many ingredient supply lines when it is time to clean the system it takes an inordinate amount of time to clean-in-place each ingredient supply line.

The present invention addresses these and other shortcomings by providing an ingredient blending manifold system and method that improves food product quality, variety, and reduces clean-in-place complexity. For these reasons and shortcomings as well as other reasons and shortcomings there is a long-felt need that gives rise to the present invention.

SUMMARY OF THE INVENTION

The shortcomings of the prior art are overcome and additional advantages are provided through the provision of an ingredient blending system for use in frozen beverage equipment and soft-serve ice cream equipment. The ingredient blending system comprises a manifold body that has at least one blending chamber, a front side, a backside, and a top side. The top side has more than one ingredient inlet port. The backside has more than one pressure reservoir. The front side has more than one ingredient egress port that intersects the pressure reservoir, and more than one ingredient ingress port that intersects the blending chamber. More than one inlet conduit is fastened to each of the ingredient inlet ports, wherein an ingredient supply line is interconnected with the inlet conduit and a supply of one or more ingredients is injected into the manifold body through the ingredient inlet port. More than one pressure sensor is secured within each pressure reservoir. The ingredient inlet port intersects the pressure reservoir allowing the ingredient to enter the pressure reservoir. The blending chamber intersects at least one of the pressure sensor reservoirs. More than one electronic valve is secured to the front side of the manifold body such that when the electronic valve is in the 'ON' or 'OPEN' position the ingredient passes, from the pressure reservoir, out of the ingredient egress port, through the ingredient ingress port, and into the blending chamber forming a food product. And when the electronic valve is in the 'OFF' or 'CLOSED' position the ingredient is prevented from egressing from the pressure reservoir through the ingredient egress port. At least one food product egress conduit is fastened to the blending chamber through which the food product egresses the manifold body.

Additional shortcomings of the prior art are overcome and additional advantages are provided through the provision of an ingredient blending system for use in frozen beverage equipment and soft-serve ice cream equipment. The ingredient blending system comprises a manifold body having at least one blending chamber, a front side, a backside, and a top side. The top side has more than one ingredient inlet port. The backside has more than one pressure reservoir. The front side has more than one ingredient egress port that intersects the pressure reservoir, and more than one ingredient ingress port that intersects the blending chamber. More than one inlet conduit is fastened to each of the ingredient inlet ports, wherein an ingredient supply line is interconnected with the inlet conduit and supplies one or more of an ingredient by injecting the ingredient into the manifold body through the ingredient inlet port. More than one pressure sensor is secured within each of the pressure reservoirs. The ingredient inlet port intersects the pressure reservoirs allowing the ingredient to enter the pressure reservoir. The blending chamber intersects at least one of the pressure sensor reservoirs. More than one electronic valve is secured to the front side of the manifold body such that when the electronic valve is in the on or open position the ingredient passes, from the pressure reservoir, out of the ingredient egress port, through the ingredient ingress port, and into the blending chamber forming a food product. At least one food product egress conduit is fastened to the blending chamber through which the food product egresses the manifold body.

A control system comprises a microcontroller, a memory, a valve controller that is operationally related to the electronic valve, and a pressure sensor controller that is operationally related to the pressure sensor. The memory, the valve controller, and the pressure sensor controller are operationally related to the microcontroller. The memory is encoded with instructions that when executed by the microcontroller perform the steps of determining a food product pressure by way of the pressure sensor.

The method continues by initiating a recipe pulse sequence when the food product pressure is below a predetermined food product pressure. The recipe pulse sequence operates the electronic valves in an 'ON' or 'OPEN' and 'OFF' or 'CLOSED' manner in a predetermined sequence allowing a predetermined portion of the ingredient to enter the blending chamber. And, terminating the recipe pulse sequence when the food product pressure is at least the predetermined food product pressure.

Additional shortcomings of the prior art are overcome and additional advantages are provided through the provision of an ingredient blending method for use in frozen beverage equipment and soft-serve ice cream equipment. The method comprises the steps of determining a food product pressure by way of a pressure sensor. A manifold body has at least one blending chamber, a front side, a backside, and a top side. The top side has more than one ingredient inlet port. The backside has more than one pressure reservoir. The front side has more than one ingredient egress port that intersects the pressure reservoir and more than one ingredient ingress port that intersects the blending chamber. More than one inlet conduit is fastened to each of the ingredient inlet ports, wherein an ingredient supply line is interconnected with the inlet conduit and supplies one or more ingredients by injecting the ingredient into the manifold body through the ingredient inlet port. More than one pressure sensor is secured within each pressure reservoir. The ingredient inlet port intersects the pressure reservoir allowing the ingredient to enter the pressure reservoir, the blending chamber intersects at least one of the pressure sensor reservoirs. More than one electronic valve is secured to the front side of the manifold body such that when the electronic valve is in the 'ON' or 'OPEN' position the ingredient passes from the pressure reservoir out of the ingredient egress port, along the front side of the manifold body under the electronic valve, through the ingredient ingress port, and into the blending chamber forming a food product, and when the electronic valve is in the 'OFF' or 'CLOSED' position the ingredient is prevented from egressing from the pressure reservoir through the ingredient egress port. And at least one food product egress conduit is fastened to the blending chamber through which the food product egresses the manifold body.

The method continues by initiating a recipe pulse sequence when the food product pressure is below a predetermined food product pressure. The recipe pulse sequence operates the electronic valves in an 'ON' or 'OPEN' and 'OFF' or 'CLOSED' manner in a predetermined sequence allowing a predetermined portion of the ingredients to enter the blending chamber. And, terminating the recipe pulse sequence when the food product pressure is at least the predetermined food product pressure.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
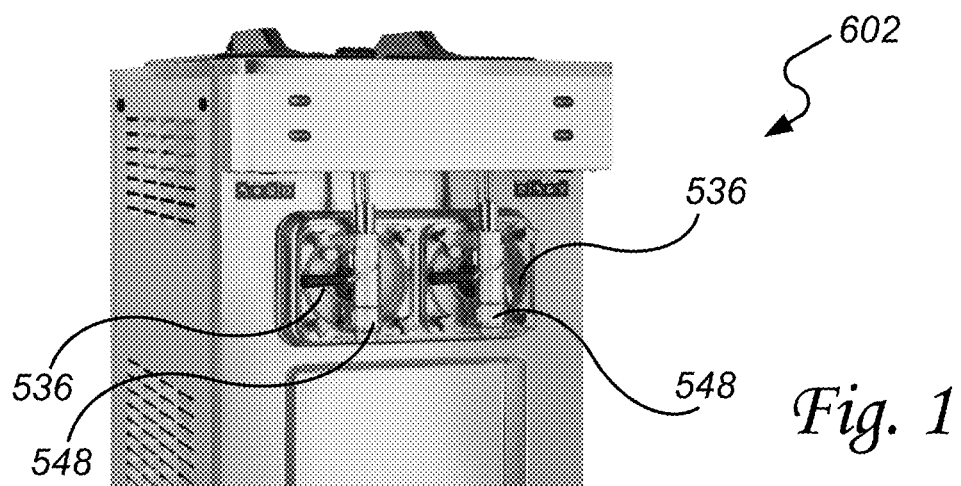
FIG. 1 illustrates examples of frozen beverage equipment and soft-serve ice cream equipment.
Figure 1:
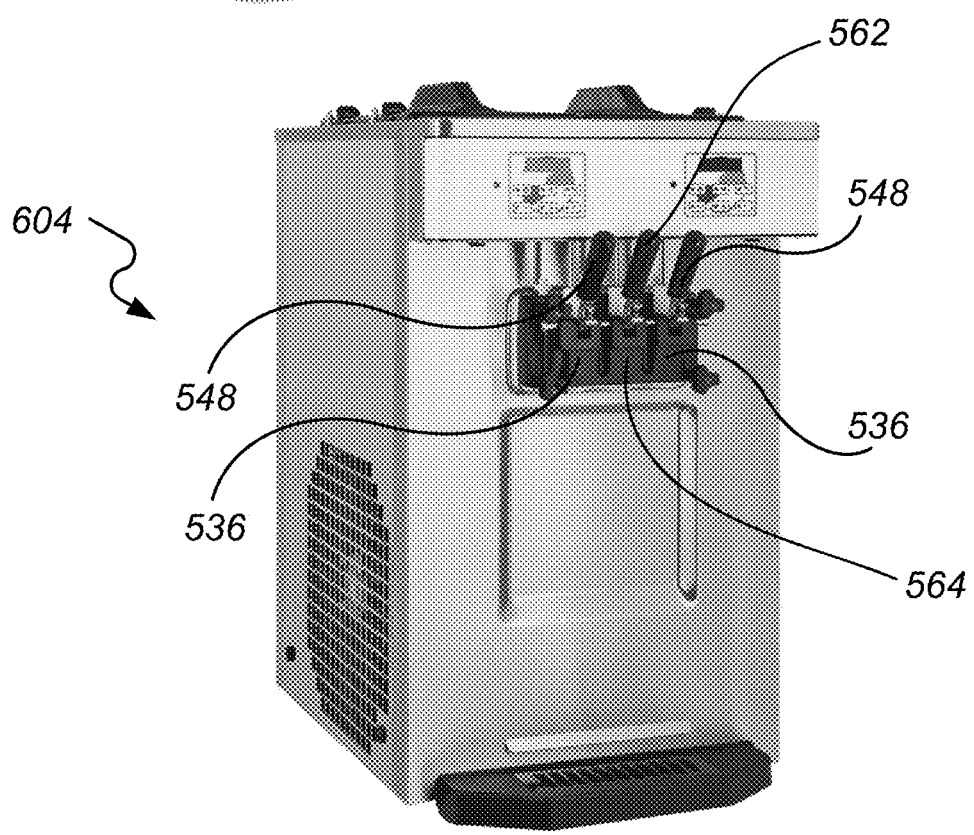

The detailed description explains the preferred embodiments of the invention, together with advantages and features, by way of example with reference to the drawings.

DETAILED DESCRIPTION OF THE INVENTION

The present invention uses nomenclature to indicate multiple mutually exclusive operating channels in the ingredient blending manifold 100. In a plurality of exemplary embodiments, there can be any number of electronic valves 110/112 and bending channels used with the ingredient blending manifold 100. As one exemplary embodiment, the Figures illustrate as an example and not a limitation three electronic valves 110A-C/112A-C. Each electronic valve 110A/112A, 110B/112B, and 110C/112C is mutually exclusive and independently operable. The electronic valve 110/112 nomenclature indicates that there is a valve base 110 which physically controls the flow of an ingredient through the valve base and a valve actuator 112 that 'OPENS' and 'CLOSES' the valve. The combination 110/112 forms the electronic valve that can be operated by way of a valve controller 512 under the control of microcontroller 502.

The present invention uses nomenclature to indicate multiple ingredients 202/204/206 and 210/212/214. Ingredient 202 on the supply side of the pump/metering device and ingredient 210 on the pumped/metered supply line side of the pump are the same. Ingredient 204 on the supply side of the pump/metering device and ingredient 212 on the pumped/metered supply line side of the pump are the same. Ingredient 206 on the supply side of the pump/metering device and ingredient 214 on the pumped/metered supply line side of the pump are the same.

The present invention uses nomenclature to indicate other multiple mutually exclusive operating components and channels associated with the ingredient blending manifold 100. In a plurality of exemplary embodiments, there can be any number of pressure sensors 106, pressure reservoirs 126, ingredient egress port 120, ingredient ingress port 122, mounting hole 114, and other components and features of the ingredient blending manifold 100, as may be required and/or desired in a particular embodiment.

For disclosure purposes, ingredients that can be mixed to form the food product 208 can include a combination of gas portion 202, food portion 204, or water portion 206. There can be more than one gas portion 202, or more than one food portion 204, as may be required and/or desired in a particular embodiment.

Turning now to the drawings in greater detail, it will be seen that in FIG. 1 there are illustrated examples of frozen beverage equipment and soft-serve ice cream equipment. Frozen beverage equipment 602 and soft-serve ice cream equipment 604 are commonly found in restaurants, quick-serve restaurants, convenience stores, and numerous other locations.

In an exemplary embodiment, each frozen beverage equipment 602 and soft-serve ice cream equipment 604 can comprise one or more separate mixing cylinders 536 that contain a food product 208. An ingredient blending manifold 100 receives a food portion 212 from a food portion supply 204 and a gas portion 210 that is either an air supply or a gas portion supply 202 that are combined to form the food product 208 which can be injected through a product inlet 544 into the mixing cylinder 536, chilled and dispensed by way of a dispense valve 548 by a user 302 or customer 304 for consumption. Selectively, in some exemplary embodiment, a water portion 214 from a water portion supply 206 can also be supplied. For disclosure purposes, the air supply and the gas portion supply, such as nitrogen, carbon dioxide, and other gases can both be referred to as the gas portion supply 202.

In an exemplary embodiment, when the frozen beverage equipment 602 or soft-serve ice cream equipment 604 is not in use to serve frozen beverages or soft-serve ice cream, a clean-in-place (CIP) function can be performed by providing a cleaning solution with or without additional water that is pumped through the ingredient blending manifold 100 and associated interconnected tubing or piping, as may be required and/or desired in a particular embodiment.

Each of the food portion 212, gas portion 210, and selectively water portion 214 are ratiometrically blended in the ingredient blending manifold 100 and then injected into the mixing cylinder 536 so that the percentage proportion of each ingredient portion to the other is maintained. The food product 208 is chilled in the mixing cylinder 536 and dispensed through a dispense valve 548. Such food product 208 dispensing can be automated and portion-controlled or effectuated by a user 302 or customer 304 manually.

The term "ratiometrically" or "ratiometric", in the present invention, is intended to mean two or more ingredients, portions, or other contents being mixed in a continuous predefined ratio regardless of the total volume being mixed forming a ratiometric mixture, such as food product 208. Such portions can be the food portion 212, the gas portion 210, water 214, or other portions. Each ingredient, portion, or other content is mixed in a predefined ratio with respect to each of the other ingredients, portions, or other contents, as may be required and/or desired in a particular embodiment. In this regard, any volume of the final food product 208 mixture comprising the ingredients, portions, or other contents can be produced. Such gas portions can be air, carbon dioxide, nitrogen, or other gas portion.

The frozen beverage equipment 602 and soft-serve ice cream equipment 604 can be configured with any number of mixing cylinders 536 comprising the same or different kinds of food portions 212, gas portions 214, and thus food products 208. Illustrated in FIG. 1, as an example and not a limitation, frozen beverage equipment 602 is shown with two separate mixing cylinders 536 and dispense valves 548. Soft-serve ice cream equipment 604 is shown with two separate mixing cylinders 536 and dispense valves 548, and one additional dispense valve 562 that combines food products from both mixing cylinders 536 into a single dispense stream 564. This configuration is common where one mixing cylinder comprises, as an example, chocolate ice cream, the other mixing cylinder comprises, as an example, vanilla ice cream, and the additional dispense valve 562 dispenses 564 a mixture of chocolate and vanilla ice cream.

In operation, the food product 208 is blended in the ingredient blending manifold 100 as a food portion 212, a gas portion 210, and selectively a water portion 214 and then injected through a product inlet 544 into mixing cylinder 536 and chilled to a predetermined frozen malleable consistency. A user 302 or customer 304 can then dispense the food product 208 by way of a dispense valve 548. The gas portion 210 can be air, carbon dioxide, nitrogen, or other types and kinds of gases, as may be required and/or desired in a particular embodiment. In an exemplary embodiment, gases such as carbon dioxide, and other gasses can be injected into the ingredient blending manifold 100 and thus the mixing cylinder 536 at a sufficient pressure to cause the gas to dissolve into the food portion 212 resulting in the food product 208 becoming carbonate in the case of dissolved carbon dioxide gas, or otherwise imbibed, or infused with the gas.

Figure 2:
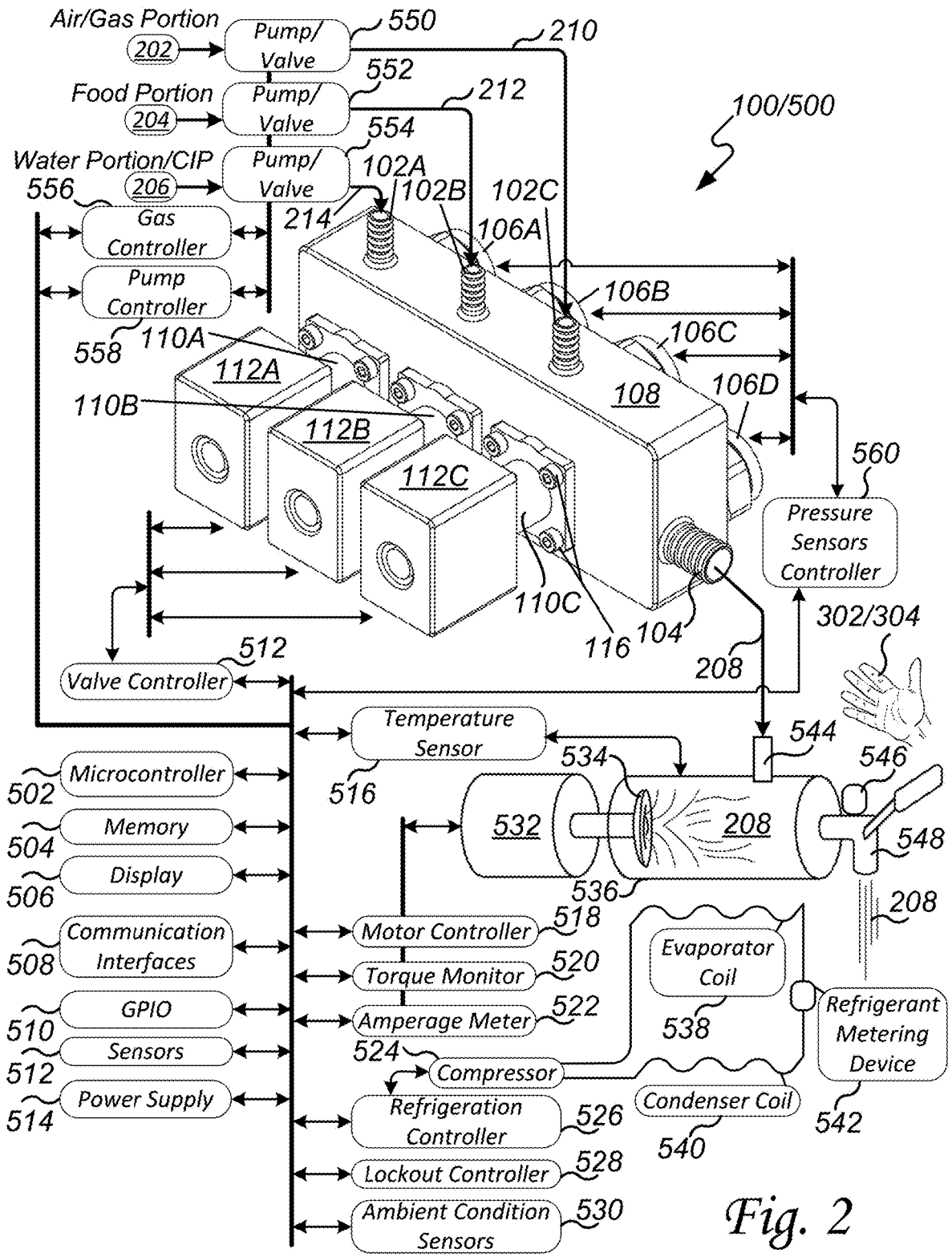
FIG. 2 illustrates one example of an ingredient blending system.

Referring to FIG. 2, there is illustrated one example of an ingredient blending system 100/500. The ingredient blending system comprises an ingredient blending manifold 100, and a control system 500 is interconnected with other components including at least one mixing cylinder 536 with food product 208 dispensing capabilities.

In an exemplary embodiment, the ingredient blending manifold 100 comprises a manifold body 108, more than one of an inlet conduit 102A-C through which ingredients such as an air/gas portion 210 from an air/gas supply 202, a food portion 212 from a food portion supply 204, and a water portion 206 from a water portion supply 206 enter the manifold body 108 through inlet conduits 102A-C. The ingredient blending manifold 100 further comprises more than one pressure sensor 106A-D. The pressure sensors 106A-D are configured to measure the pressure of each ingredient 210/212/214 that enters through the inlet conduits 102A-C, and the blended food product 208 that exits the manifold body 108 blending chamber 128 through the food product egress conduit 104.

The ingredient blending manifold 100 further comprises more than one electronic valve 110A-C/112A-C. The electronic valves 110A-C/112A-C are secured to the front side of the manifold body 108 such that when one or more of an electronic valve 110A-C/112A-C is in the 'OPEN' position the respective ingredient 210/212/214 passes into the blending chamber 128, which is internal to the manifold body 108, where it is blended with other ingredients 210/212/214 to form the food product 208. In the alternative, when an electronic valve 110A-C/112A-C is in the 'CLOSED' position the respective ingredient 210/212/214 is prevented from entering the blending chamber 128. The blending chamber 128 is better illustrated in at least FIG. 9.

In an exemplary embodiment, the electronic valve 110A-C/112A-C can comprise a valve body 110A-C that is fastened to the manifold body 108 by fasteners 116 and an actuator 112A-C which when energized transitions a valve within the valve body 110 between an 'OPEN' and a 'CLOSED' position. The 'OPEN' position allows ingredients 202/204/206 to enter the blending chamber 128 and the 'CLOSED' position abates the flow of ingredients 202/204/206 from entering the blending chamber 128. In operation, one electronic valve 110A/112A, 110B/112B, or 110C/112C controls the flow of one ingredient 202, 204, or 206, thus multiple electronic valves are required to be able to control multiple ingredient supply lines.

In an exemplary embodiment, control system 500 can be integrated into and control frozen beverage equipment 602 and soft-serve ice cream equipment 604. In addition, control system 500 can be a web-enabled control system.

The term "web-enabled" or "web-enabled control system" or "web-enabled control system 500" in the present invention is intended to mean an Internet-of-Things (IoT) device. In this regard, a device that is capable of connecting a physical device such as the frozen beverage equipment 602 and soft-serve ice cream equipment 604 to the digital world. Stated differently, web-enabling is equipping a device with the necessary electronics and software to be monitored, controlled, and data communicate locally and remotely with other data communicating devices. Such other data communicating devices can be smartphones, tablets, laptops, mobile communication devices, other web-enabled devices, servers, and similar devices.

In addition, such data communicating devices 706 can data communicate with remote data processing resources 704 and utilize data storage resources 702. Laptops, smartphones, smartwatches, tablets, desktop computers, servers, mobile communication devices, and other types and kinds of data communication devices can all be referred to as data communicating devices 706.

In operation, a user 302, or a customer 304 can use data communicating devices 706 to interact with the frozen beverage equipment 602 and soft-serve ice cream equipment 604. In this regard, a user 302 can be a person who operates, maintains, cleans, configures, repairs, and performs other functions on or with the frozen beverage equipment 602 or soft-serve ice cream equipment 604. A customer 304 can be a person who self-serve dispenses food product 208. The digital experience and interaction with the frozen beverage equipment 602 and soft-serve ice cream equipment 604 by the user 302, and customer 304 can be different and suited for their various roles and requirements, as may be required and/or desired in a particular embodiment.

Such data processing resources 704 can be a server or other types and kinds of data processing resources. Furthermore, data communicating devices 706, remote data processing resources 704, data storage resources 702, and other types and kinds of data communicating devices can data communicate over a global network 700. The Internet is a global network 700.

In an exemplary embodiment, the frozen beverage equipment 602 and soft-serve ice cream equipment 604 can be equipped with a web-enabled control system 500. Such a web-enabled control system can comprise a microcontroller 502 which is operationally related to a valve controller 512, a plurality of communication interfaces 508, a power supply 514, a gas controller 556, a pump controller 558, a display 506, general-purpose inputs and outputs (GPIO) 510, sensors 512, motor controller 518, a memory 504, a torque monitor 520, an amperage meter 522, a refrigeration controller 526, a temperature sensor 516, ambient sensors 530, and a lockout controller 528.

The microcontroller 502 can be INTEL, ZILOG, MICROCHIP, AMD, ARM, and/or other types or kinds of microcontrollers.

The memory 504 can be a combination of RAM, ROM, flash, hard drives, solid-state drives, USB flash drives, and/or other types and kinds of memory.

The display 506 can be an LCD, OLED, LED, as well as have touch input capabilities and/or other types and kinds of displays and user inputs as may be required and/or desired in a particular embodiment.

The communication interface 508 can be LAN, WAN, USB, Ethernet, RS232, RS485, serial, WiFi, 802.11abgn and similar, 2G 3G 4G 5G compatible, Bluetooth, TCP, UDP, Mesh Network, Zigbee, Pico Network, LORAN, and/or other types and kinds of communication interfaces and protocols.

In an exemplary embodiment, the communication interface 508 is operationally related to the microcontroller 502. The control system by way of the communication interface 508 data communicates with the remote data processing resource 704, data communication devices 706, remote service provider 306 networks, quick-server restaurant networks, other frozen beverage equipment 602 and soft-serve ice cream equipment 604, in a local area network environment or a wide area network environment across a global network 700 in a wired or wireless manner as may be required and or desired in a particular embodiment. The Internet is a global network 700.

The power supply 514 can be AC, DC, battery, solar, and/or other types and kinds of power supplies.

The pump controller 558 can be a relay, MOSFET, or other types and kinds of controlling devices. In operation, the pump controller 558 interconnects with and is operationally related to one or more pumps 552/554 that transfer the food portion supply 204/212 and the water or clean-in-place (CIP) solution supply 206/214 to the ingredient blending manifold 100. In an exemplary embodiment, the food portion 204 pump/valve 552 and the water portion 206 water pump/valve 554 can include pressure regulating valves limiting the inlet pressure to a desired and fixed pressure and flow rate from their respective food portion 204 and water portion 206 sources. As such, the pump/valve 552/554 can pump to create flow and/or regulate the pressure to induce the desired and predictable flow rate. The pump/valve 552/554 can be 'OPENED' turned 'ON' and/or 'CLOSED' turned 'OFF' to control the food portion 204 and water portion 206 flows. In addition, pump/valve 552/554 can also comprise one-way valves to limit water and/or food portion flow to a single direction and prevent backfilling.

The gas controller 556 can be a relay, MOSFET, metering device, or other types and kinds of controlling devices. In operation, the gas controller 556 interconnects with and is operationally related to one or more gas metering devices or pumps 550 that transfer air or gas 202/210 to the ingredient blending manifold 100. Such gas portions can be air, carbon dioxide, nitrogen, or other gas portion.

The valve controller 512 can be a relay, MOSFET, or other types and kinds of controlling devices. In operation, the valve controller 512 interconnects with and is operationally related to one or more electronic actuators 112A-C that 'OPEN' and 'CLOSE' the valve bodies 110A-C allowing ingredients to be transferred into the blending chamber 128. Such electronic actuators can be solenoids or other types and kinds of actuators, as may be required and/or desired in a particular embodiment.

The motor controller 518 can be a relay, MOSFET, variable frequency drive controller (VFD), or other types and kinds of motor control devices.

The torque monitor 520 can be a communication interface that communicates with a motor controller such as a VFD motor controller or other motor controllers that provides information about the motor performance that can include a torque metric determination or other motor performance data such that the control system 500 can calculate the torque of the auger motor 532 resultant from the torque on the auger 534 turning through the food product 208. In an exemplary embodiment, analog-type sensor determinations can be converted to digital values so that the microcontroller 502 can process the data. Alternatively, the microcontroller 502 can perform analog-to-digital conversions if equipped to perform such functions.

In another exemplary embodiment, torque can be measured mechanically by having a force of the food product 208 mixed in the mixing cylinder 536 applied to a lever that increasingly displaces as the food product 208 transitions to a predetermined frozen malleable consistency. The amount of displacement of the lever can be measured by the torque monitor 520 automatically electronically to determine a relative torque reading that can then be used in the methods of the present invention.

The amperage meter 530 can be a current transformer such as a torrid coil winding having one of the auger motor electrical wires running through the center of the torrid coil, or other types and kinds of electrical current sensing techniques and/or devices. In an exemplary embodiment, analog-type sensor determinations can be converted to digital values so that the microcontroller 502 can process the data. Alternatively, the microcontroller 502 can perform analog-to-digital conversions if equipped to perform such functions.

A refrigeration system comprises the refrigeration controller 526. The refrigeration controller 526 can be a relay, MOSFET, or other types and kinds of refrigeration controlling devices. The refrigeration system further comprises a compressor 524 that is interconnected with and operationally related to the refrigeration controller 526. The compressor 524 circulates the refrigerant through a condenser coil 540, a refrigerant metering device 542 such as an expansion valve, and an evaporate coil 538. In operation, the refrigeration system chills the food product 208 in the mixing cylinder 536 to a predetermined frozen malleable consistency. The refrigeration system can use a variety of refrigerant types including for example thermoelectric such as Peltier and others, vapor-compression, non-vapor-compression, and other types and kinds of refrigeration system, as may be required and/or desired in a particular embodiment.

The temperature sensor 516 can be positioned and configured to measure the temperature of the food product 208 within the mixing cylinder 536. Such a temperature sensor 516 can be a resistive temperature (RTD), thermistor, infra-red, integrated silicon-based, or other types and kinds of temperature sensors as may be required and/or desired in a particular embodiment. In an exemplary embodiment, analog-type sensor determinations can be converted to digital values so that the microcontroller 502 can process the data. Alternatively, the microcontroller 502 can perform analog-to-digital conversions if equipped to perform such functions.

In an exemplary embodiment, a user interface comprises at least one of the following a display 506, a display 506 with touchscreen, a communication interface 508 configured to data communicate with a digital computing device 706, a plurality of button input capabilities by way of the GPIO 510, or other user interfaces. The user interface is operationally related to the microcontroller 502 such that a user 302 or customer 304 can enter the portion-controlled dispense amount volume by way of the user interface.

The pressure sensor control is interconnected with and operationally related to a plurality of pressure sensors 106A-D. In an exemplary embodiment, a pressure sensor 106A-D can be diagram displacement-based, strain gauge, variable capacitance, resistive, piezoelectric, micro-electrical mechanical system (MEMS), and/or other types and kinds of pressure sensors, as may be required and/or desired in a particular embodiment. In an exemplary embodiment, analog-type sensor determinations can be converted to digital values so that the microcontroller 502 can process the data. Alternatively, the microcontroller 502 can perform the analog-to-digital conversions if equipped to perform such functions.

The GPIO 510 can be TTL, CMOS, transistors, buffers, relays, pushbutton, switch, and/or other types and kinds of GPIO circuits.

The sensors 512 can be PIR motion sensors, infrared, thermal, Doppler radar, ultrasonic, capacitance, touch-type, optical, Hall effect, switch, fingerprint, and other types of biometric sensors, and/or other types and kinds of sensors. In an exemplary embodiment, analog-type sensor determinations can be converted to digital values so that the microcontroller 502 can process the data. Alternatively, the microcontroller 502 can perform analog-to-digital conversions if equipped to perform such functions.

The ambient condition sensors 530 can be temperature, moisture, humidity, sunlight, time, date, and/or other types and kinds of sensors. In an exemplary embodiment, analog-type sensor determinations can be converted to digital values so that the microcontroller 502 can process the data. Alternatively, the microcontroller 502 can perform analog-to-digital conversions if equipped to perform such functions.

A lockout controller 528 can be a relay, MOSFET, solenoid, or other types and kinds of lockout controlling devices In operations, a dispense lock 546 is operationally related to a lockout controller 528. The dispense lock 546 can be a solenoid or other types or kinds of dispense locks, as may be required and/or desired in a particular embodiment. The dispense lock 546 can operate in at least two distinct configurations. First, the dispense lock 546 can unlock the dispense valve 548 for normal operation, allowing a user 302 or a customer 304 to dispense the food product 208 when the temperature and/or the viscosity of the food product 208 is optimum, and as required other parameters indicate the food product 208 is ready to be served. In the alternative, the lockout controller 528 can lock the dispense valve 548 preventing food product 208 dispense when the food product 208 is not ready to be served. The second manner of operation can be enabling an automated dispense valve 548. In this configuration, the dispense lock 546 can be coupled to a dispense valve 548 where activation causes the dispense valve 548 to 'OPEN' allowing the food product 208 to egress the mixing chamber 536. In the alternative when the dispense lock 546 is deactivated the dispense valve 548 is 'CLOSED' such that the food product 208 is prevented from egressing the dispense valve 548. Such automated food product 208 dispense control is useful in quick-serve restaurant applications, portion control applications, and other applications.

Figure 3:
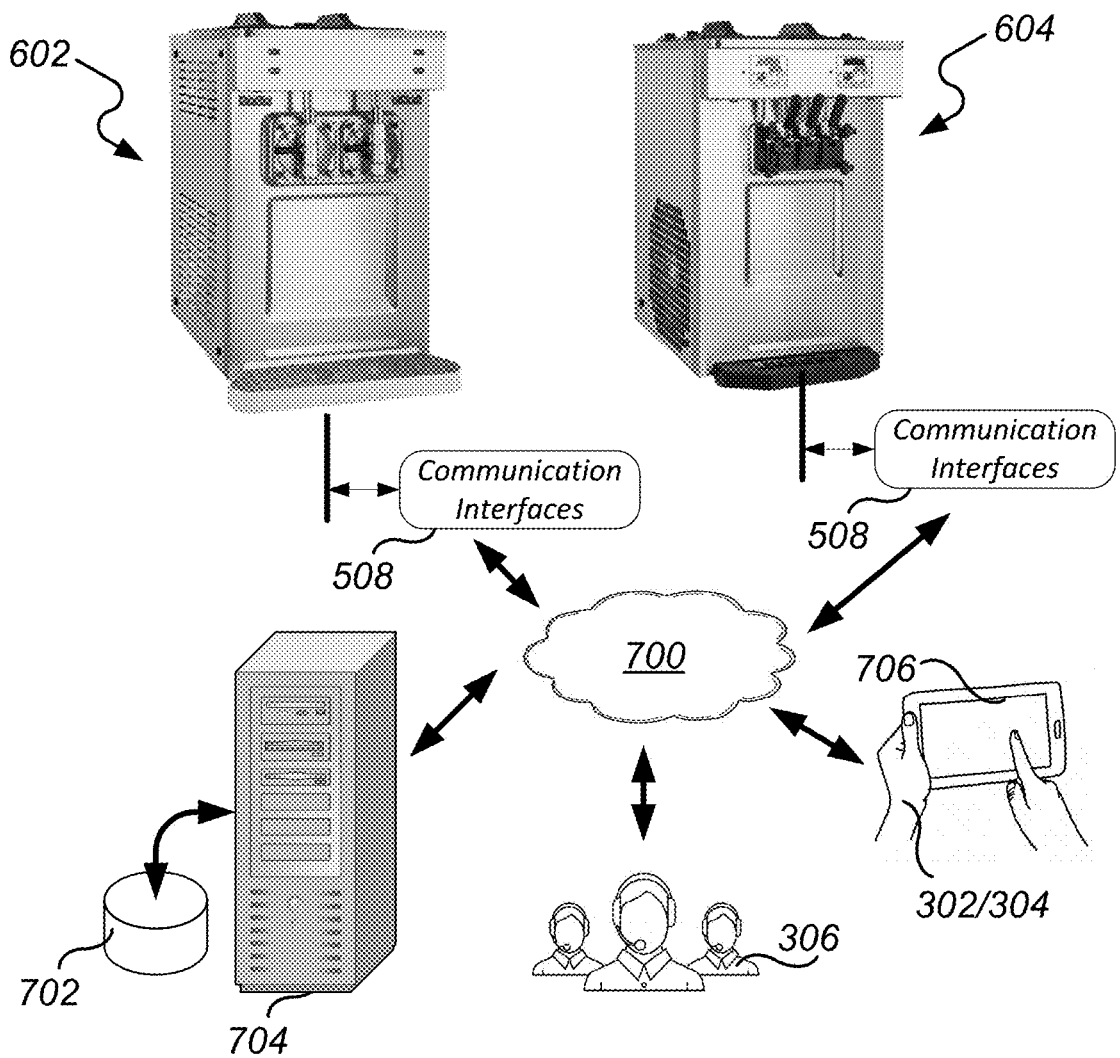
FIG. 3 illustrates one example of a global network-based system block diagram.

Referring to FIG. 3, there is illustrated one example of a global network-based system block diagram. In an exemplary embodiment, by way of control system 500 communication interface 508, frozen beverage equipment 602 and soft-serve ice cream equipment 604 can data communicate over a global network 700 with one or more remote data processing resources 704, databases 702 that are operationally related to a remote data processing resource 704, one or more data communication device 706 operated by user 302 or customer 304, and one or more remote service provider 306. The Internet is one example of a global network 700. Database 702 is operationally related to the remote data processing resource 604. In addition, there can be any number of remote data processing resources 704, and/or database 702, as well as other global network-based computing devices, as may be required and/or desired in a particular embodiment.

Such data communication devices 706 can include smartphones, tablets, laptops, other web-enabled devices, mobile communication devices, and other data communication devices, as may be required and/or desired in a particular embodiment.

Such remote data processing resource 704 can be a server, network appliance, or other types and kinds of remote data processing resources, as may be required and or desired in a particular embodiment.

Such remote service provider 306 can be a technical service network, a call center, a customer service organization, an alarm/equipment service monitoring company, or other types and kinds of remote service providers.

Figure 4:
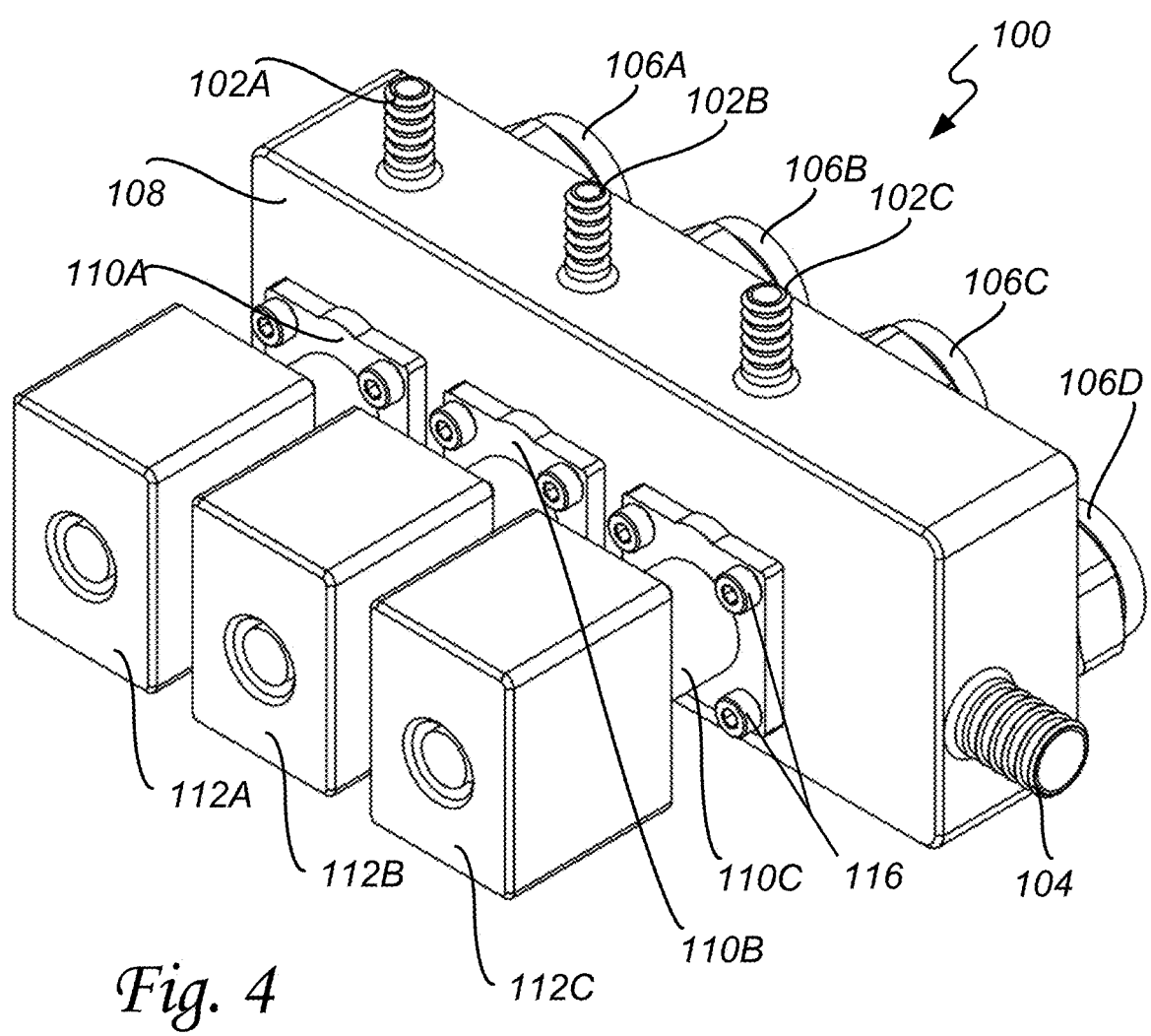
FIGS. 4-6 illustrate examples of an ingredient blending manifold.

Referring to FIG. 4, there is illustrated one example of a top front perspective view of an ingredient blending manifold 100. In an exemplary embodiment, the electronic valves 110A-C/112A-C are fastened by way of fasteners 116 to the front side of the manifold body 108.

Figure 5:
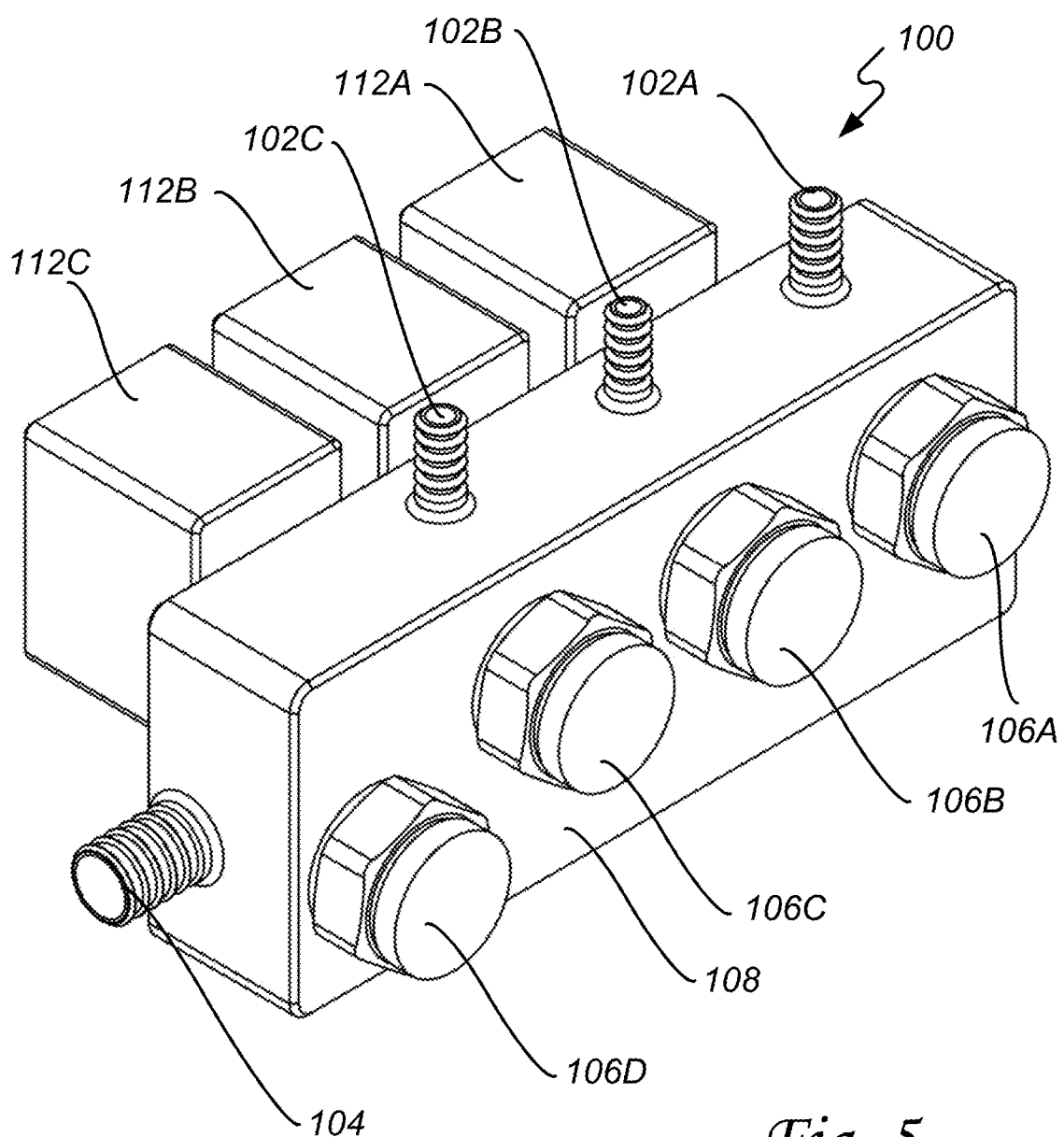

Referring to FIG. 5, there is illustrated one example of a top backside perspective view of an ingredient blending manifold 100. In an exemplary embodiment, pressure sensors 106A-D are secured within each of the pressure reservoirs 126A-D. The pressure reservoirs 126A-D are better illustrated in at least FIG. 8.

Figure 6:
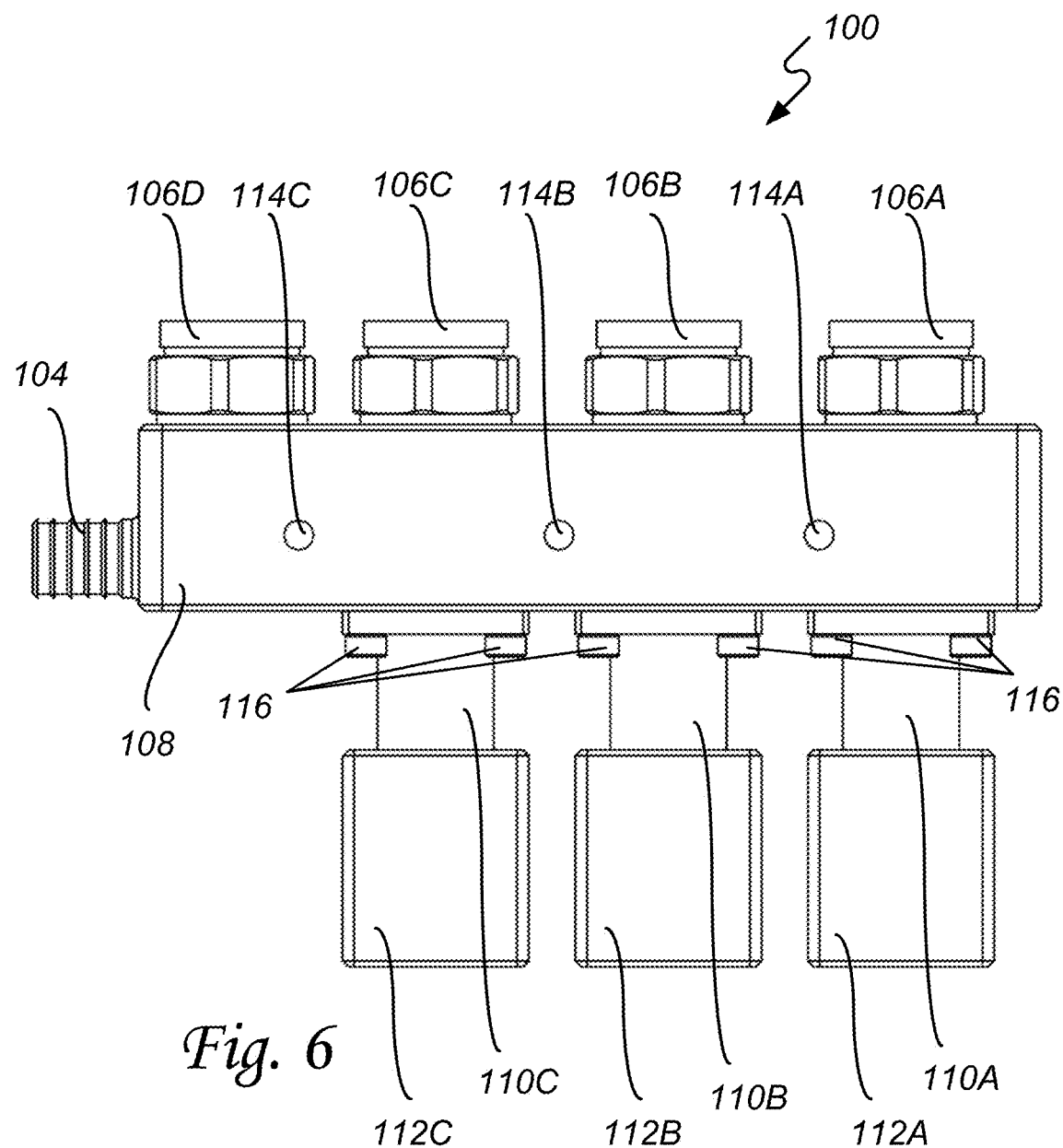

Referring to FIG. 6, there is illustrated one example of a bottom side view of an ingredient blending manifold 100. In an exemplary embodiment, the manifold body 108 can have one or more mounting holes 114A-C for receiving a fastener and securing the manifold body 108 in place within the frozen beverage equipment 602 or soft-serve ice cream equipment 604. Such fasteners can be fastener 116 such as a screw or bolt, or other types and kinds of fasteners, as may be required and or desired in a particular embodiment.

Figure 7:
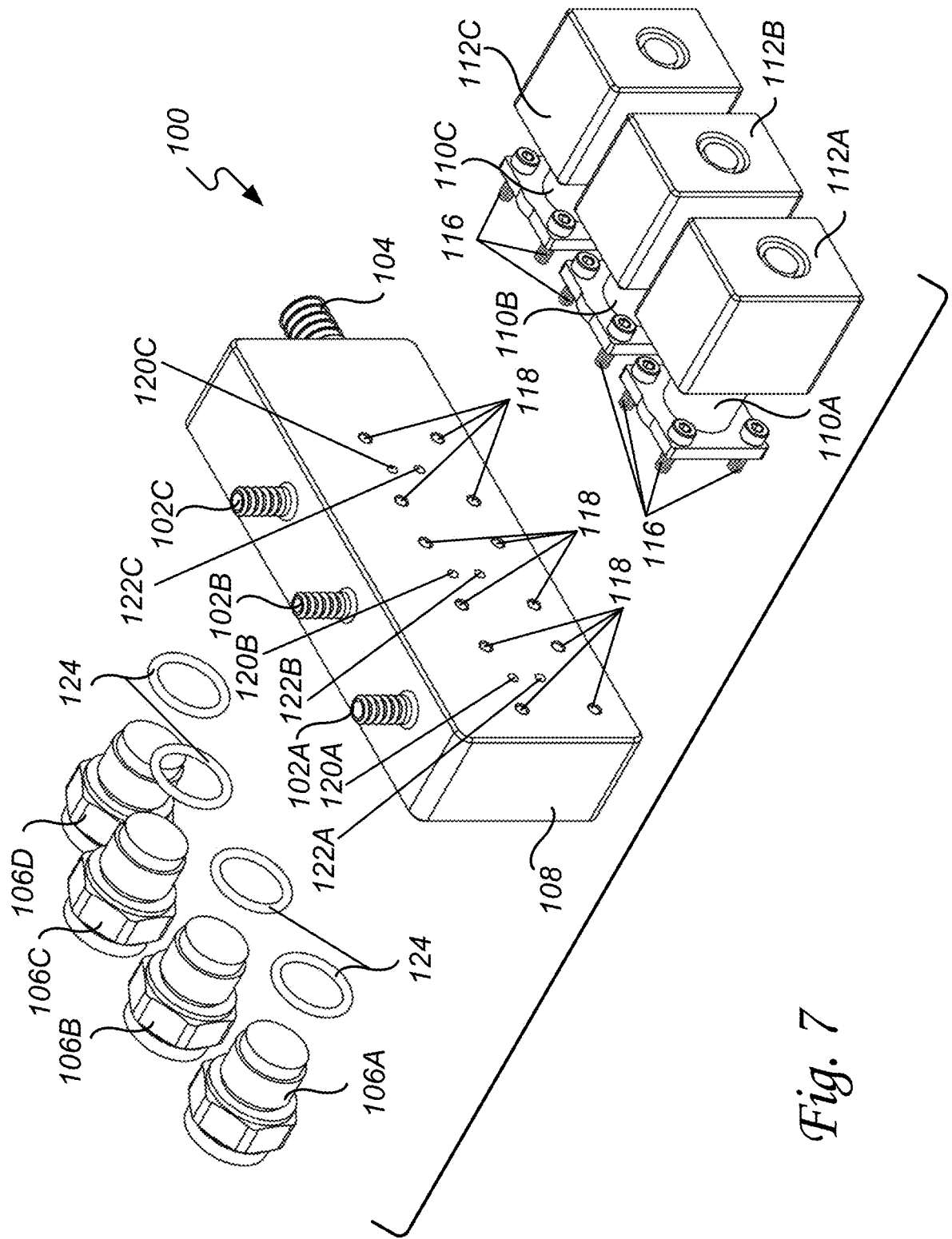
FIGS. 7-8 illustrate examples of a disassembled ingredient blending manifold.
Figure 8:
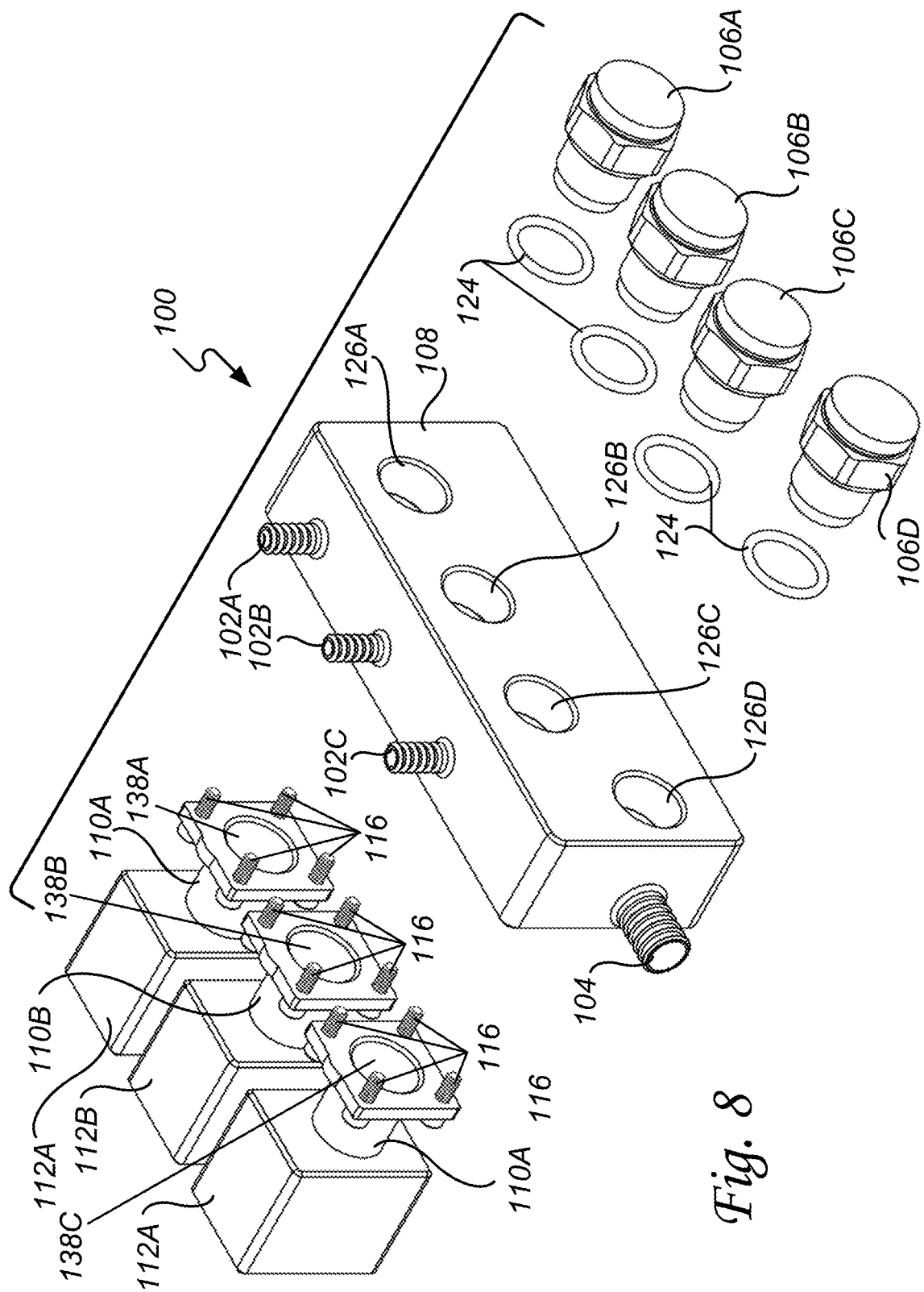

Referring to FIGS. 7 and 8 there is illustrated a top front side perspective view in FIG. 7 and a top backside perspective view of a disassembled ingredient blending manifold 100. With reference to FIG. 7, in an exemplary embodiment, mounting holes 118 can be threaded and positioned to engage fasteners 116 such as a screw or bolt in a manner that secures the electronic valve 110A-C/112A-C to the front side surface of the manifold body 108. Additionally, an o-ring 124 can be placed around each of the pressure sensors 106A-D when the pressure sensors 106A-D are secured to the manifold body 108. In this regard, the o-rings 124 prevent the ingredient 210/212/214 from leaking from the pressure reservoirs 126A-C under the pressure sensors 106A-C and from leaking from the blending chamber 128 that passes under the pressure sensor 106D.

The manifold body 108 has more than one ingredient egress port 120A-C that connects the front surface to the pressure reservoir 126A-C and more than one ingredient ingress port 122A-C that connects the front surface to the blending chamber 128. When secured to the manifold body, each of the electronic valves 110A-C/112A-C covers an ingredient egress port 120A-C and an ingredient ingress port 122A-C.

In this regard and with reference to FIG. 8, an ingredient 210/212/214 can be injected into an inlet conduit 102A-C and travels along the ingredient inlet port 130/132/134 pathway into the pressure reservoir 126 A-C. In the 'CLOSED' position the electronic valve 110A-C/112A-C blocks the ingredient egress port 120A-C preventing the ingredient 210/212/214 from exiting the pressure reservoir 126A-C. In the 'OPEN" position such as when energized, the electronic valve 110A-C/112A-C retracts creating a temporary ingredient transfer void 138A-C under the electronic valve 110A-C/112A-C that allows the ingredient 210/212/214 to exit the ingredient egress port 120A-C and traverse along the surface of the front side under the electronic switch 110A-C/112A-C contained within the ingredient transfer void 138A-C as not to leak, exiting the ingredient egress port 120A-C and entering the ingredient ingress port 122A-C.

Figure 9:
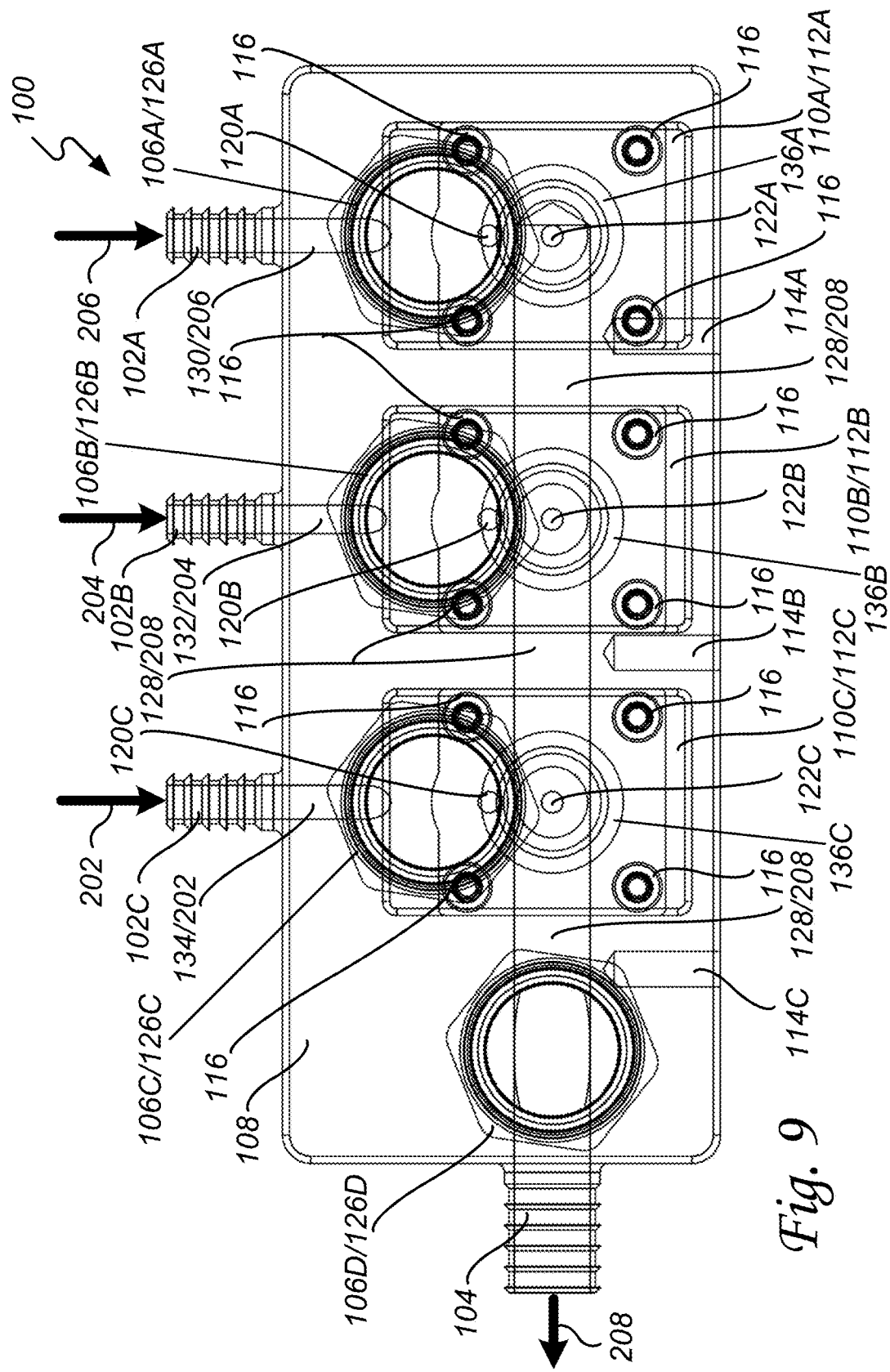
FIG. 9 illustrates one example of an inside view of an ingredient blending manifold that shows the internal ingredient flow and blending chamber pathways.

In operation and with reference to at least FIG. 9, when the electronic valve 110A-C/112A-C is in the 'OPEN' position the ingredient 210/212/214 passes from the pressure reservoir 126A-C out of the ingredient egress port 120A-C, along the front side of the manifold body 108 under the electronic valve 110A-C/112A-C, through the ingredient ingress port 122A-C, and into the blending chamber 108 forming the food product 208. And when the electronic valve 110A-C/112A-C is in the 'CLOSED' position the ingredient 210/212/214 is prevented from egressing, from the pressure reservoir 126A-C, through the ingredient egress port 120A-C.

Referring to FIG. 9, there is illustrated one example of an inside view of an ingredient blending manifold 100 that shows the internal ingredient flow and blending chamber 128 pathways. In an exemplary embodiment, an ingredient blending system 100/500 can be used in frozen beverage equipment 602 and soft-serve ice cream equipment 604. The ingredient blending system 100/500 comprises a manifold body 108 having at least one blending chamber 128, a front side, a backside, and a top side. The top side has more than one ingredient inlet port 130/132/134. The backside has more than one pressure reservoir 126A-D. The front side has more than one ingredient egress port 120A-C that intersects the pressure reservoir 126A-C and more than one ingredient ingress port 122A-C that intersects the blending chamber 128.

More than one inlet conduits 102A-C is fastened to each of the ingredient inlet ports 130/132/134 wherein an ingredient supply line 210/212/214 can be interconnected with the inlet conduits 102A-C and supply one or more of an ingredient 202/204/206 by injecting the ingredient 202/204/206 into the manifold body 108 through the ingredient inlet ports 130/132/134.

More than one pressure sensor 106A-D is secured within each of the pressure reservoirs 126A-D. The ingredient inlet ports 130/132/134 intersect the pressure reservoir 126A-C allowing the ingredients 202/204/206 to enter the pressure reservoir 126A-C. The blending chamber 128 intersects more than one of the pressure sensor reservoirs 126A-C.

More than one electronic valve 110A-C/112A-C is secured to the front side of the manifold body 108 such that when the electronic valve 110A-C/112A-C is in the 'OPEN' position the ingredient 202/204/206 passes from the pressure reservoir 126A-C out of the ingredient egress port 120A-C, along the front side of the manifold body 108 under the electronic valve 110A-C/112A-C through the ingredient ingress port 122A-C and into the blending chamber 128 forming a food product 208. And, when the electronic valve 110A-C/112A-C is in the 'CLOSED' position the ingredient 202/204/206 is prevented from egressing the pressure reservoir 126A-C through the ingredient egress port 120A-C. At least one food product egress conduit 104 is fastened to the blending chamber 128 through which the food product 208 egresses the manifold body.

In an exemplary embodiment, the ingredients 202/204/06 traverse along the surface of the front side of the manifold body 108 between the ingredient egress port 120A-C and the ingredient ingress port 122A-C contained within an ingredient transfer void 136A-C that is temporarily created when the electronic valve 110A-C/112A-C is opened or otherwise energized.

In an exemplary embodiment, the manifold body 108 has a bottom side. The bottom side has at least one mounting hole 114A-C for receiving a fastener and securing the manifold body 108 in place within the frozen beverage equipment 602 or soft-serve ice cream equipment 604. The fastener can be a screw fastener such as fastener 116 or other types and kinds of fasteners, as may be required and/or desired in a particular embodiment.

In an exemplary embodiment, a food portion 204 is one of the ingredients and is interconnected by way of the ingredient supply line 212 with at least one of the inlet conduits 102B. A gas portion 202 is one of the ingredients and is interconnected by way of the ingredient supply line 210 with at least one of the inlet conduits 102C. The food product 208 comprises the gas portion 202 and the food portion 204.

In an exemplary embodiment, a water portion 206 is one of the ingredients and is interconnected by way of the ingredient supply line 214 with at least one of the inlet conduit 102A. The food product can comprise the water portion 206.

In an exemplary embodiment, a clean-in-place solution is interconnected with at least one of the inlet conduit 102A, wherein the ingredient blending system can be cleaned by injecting the clean-in-place solution. The clean-in-place solution can be a caustic solution, a mixture of a caustic solution and water, an aqueous ozonated water solution, or other types or kinds of solutions as may be required and/or desired in a particular embodiment.

Figure 10A:
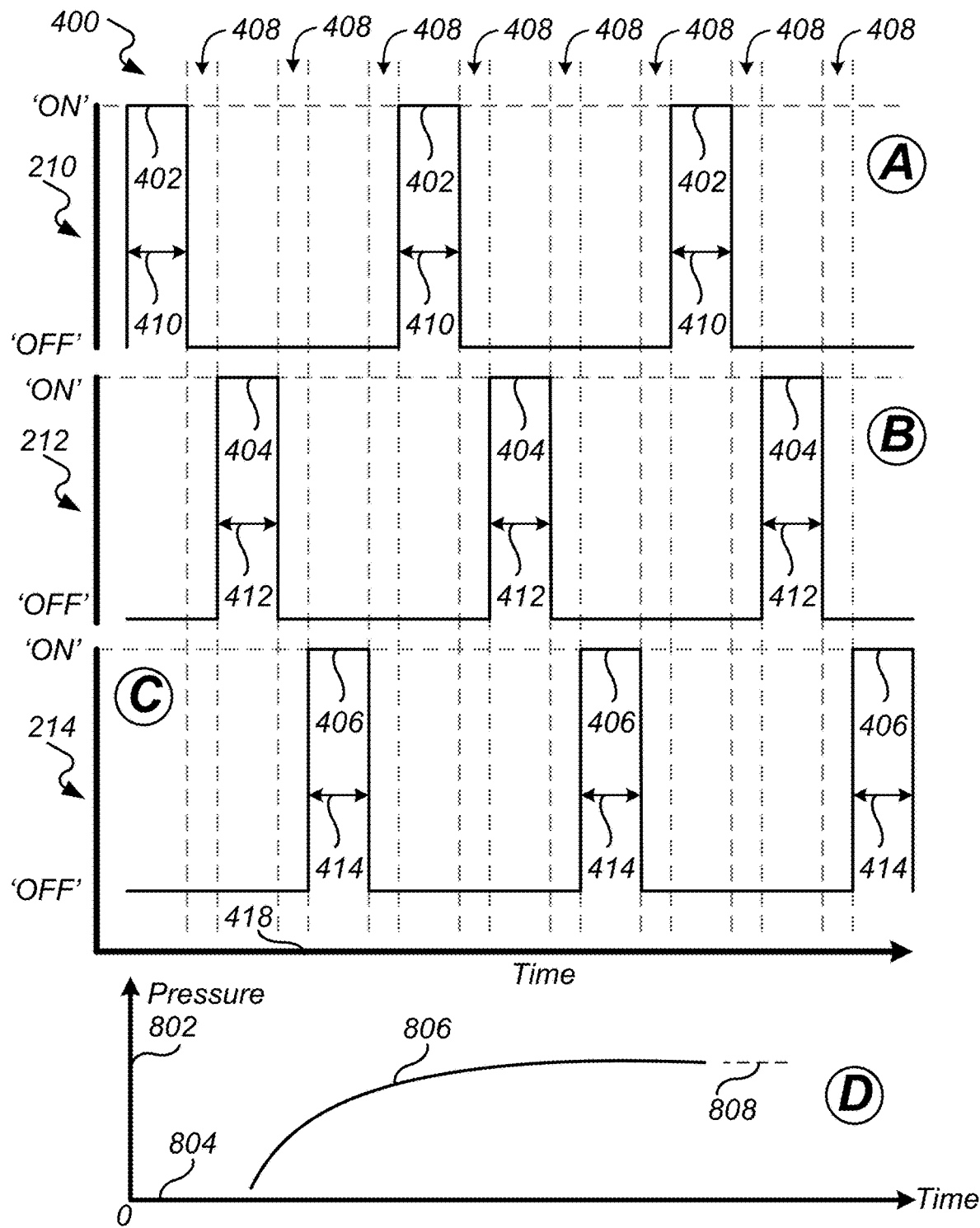
FIGS. 10A-B illustrate examples of a recipe pulse sequence.

Referring to FIG. 10A, there is illustrated one example of a recipe pulse sequence 400. In an exemplary embodiment, the recipe pulse sequence 400 is one or more of the electronic valves 110A-C/112A-C being energized and/or otherwise 'OPENED' for a predetermined amount of time to allow ingredients 210/212/214 to enter the blending chamber 128. A longer 'OPEN' predetermined amount of time allows more of the specific ingredient 210/212/214 to enter the blending chamber 128. By predetermining an amount of time for each ingredient 210/212/214 in a recipe, the ingredient amounts can be blended to form the food product 208. As an example, with pumps 552 and 554 providing comparable performance, a ratio of one part food portion 204, to two parts water portion 206 can be achieved by 'OPENING' electronic valve 110A/112A that controls the water portion 206 flow into the blending chamber 128 for twice the amount of time as the electronic valve 110B/112B that controls the flow of the food portion 202 into the blending chamber 128.

In a plurality of exemplary embodiment, the recipe pulse sequence 400 can be varied between at least some of the ingredients 210/212/214 based on the recipe concentrations, the pump performance characteristics, and other factors. Such ingredients can be liquids or gases and can be pumped, valve controlled, or metered 550/552/554, as may be required or desired for a particular recipe embodiment. For disclosure purposes, not all ingredients made be needed for every recipe. As an example. the water portion 206 may not be needed when the food portion 204 does not require to be diluted. Other ingredients may or may not be needed in other recipes, as may be desired and/or required in a particular embodiment.

With reference to FIG. 10A, there is illustrated a recipe pulse sequence 400. The recipe pulse sequence 400 can be represented as a square wave 402/404/406 that indicated a time period 418 that an electronic valve 110A-C/112A-C is energized 'ON' or 'OPEN' 410/412/414 to allow ingredient flow or in standby 'OFF' or "CLOSED" abating ingredient flow.

In an exemplary embodiment, in reference 'A' initially electronic valve 110C/112C is energized allowing ingredient 210 to enter the blending chamber 128 for a predetermined time period 410. The recipe pulse sequence 400 then continues in reference 'B' by energizing electronic valve 110B/112B allowing ingredient 212 to enter the blending chamber 128 for a predetermined time period 412. The recipe pulse sequence 400 then continues in reference 'C' by energizing electronic valve 110A/112A allowing ingredient 214 to enter the blending chamber 128 for a predetermined time period 414.

As the blending chamber 128 is filled the blended ingredients are conveyed through at least one tube to the product inlet 544 where the food product 208 enters the mixing cylinder 536 and is chilled and circulated by auger 534 into a frozen malleably consistency and dispensed by way of the dispense valve 548 by a user 302 or customer 304. The auger 534 is rotated by way of auger motor 532.

The recipe pulse sequence 400 repeats as needed. Each recipe pulse sequence 400 ratiometrically blends one or more of the various ingredients 210/212/214 by injecting them in predetermined quantities into the blending chamber 128 until the food product pressure 106 in the mixing cylinder 536 reaches a desired predetermined food product pressure 808. In an exemplary embodiment, such food product pressure 806 can be monitored by pressure sensor 106D. The predetermined food product pressure can be selected as part of configuring the frozen beverage equipment 602 or the soft-serve ice cream equipment 604.

In this regard, in an exemplary embodiment, a mixing cylinder 536 can be interconnected to the food product egress conduit 104 and receives the food product 208. The mixing cylinder 536 comprises an auger 534 that is interconnected with an auger motor for circulating the food product 208 within the mixing cylinder 536 and a dispense valve 548 for dispensing the food product 208 from the mixing cylinder 536.

A control system 500 comprises a microcontroller 502, a memory 504, a valve controller 512 that is operationally related to the electronic valve 110A-C/112A-C, and a pressure sensor controller 560 that is operationally related to the pressure sensors 106A-D. The memory 504, the valve controller 512, and the pressure sensor controller 560 are operationally related to the microcontroller 502. The memory 504 can be encoded with instructions that when executed by the microcontroller 502 perform the steps of determining a blending chamber 128 pressure by way of the pressure sensor 106D. The method continues by initiating a recipe pulse sequence 400 when the blending chamber pressure 806 is below a predetermined food product pressure 808. The recipe pulse sequence 400 operates one or more of the electronic valves 110A-C/112A-C in an 'ON' and 'OFF' manner in a predetermined sequence allowing predetermined portions of the ingredients 210/212/214 to enter the blending chamber 128. The method continues by terminating the recipe pulse sequence 400 when the blending chamber pressure 806 is at least the predetermined food product pressure 808. In operation, the mixing chamber 536 is continually refilled with blended food product 208 after each dispense of the food product 208 by way of the dispense valve 548.

In an exemplary embodiment, different ingredients 210/212/214 can be injected into the blending chamber 128 sequentially so as to not create variable pressure changes in the blending chamber 128 during ingredient injection. Such blending chamber 128 variable pressure changes by pumping more than one ingredient at a time into the blending chamber 128 can create ratio inaccuracies in the blended food product 208. As an example, trying to inject gas and liquid at the same time can create pressure variances within the blending chamber 128 that can lead to the blended food product 208 ingredient ratios being inaccurate.

An advantage, in the present invention, is that a food product pressure stabilization time period 408 can be added between each transition to a different electronic valve 110A-C/112A-C. The food product pressure stabilization time period 408 provides a brief predetermined time period between ingredient 210, 212/, or 214 injections into the blending chamber 128 to allow the pressure within the blending chamber 128 to stabilize before introducing the next ingredient 210/212/214 in the recipe pulse sequence 400. In operation, in this regard, the memory 504 can be encoded with instructions that when executed by the microcontroller 502 perform the step of adding a food product pressure stabilization time period 408 when the recipe pulse sequence 400 transitions between the electronic valves 110A-C/112A-C, wherein the blending chamber 128 pressure is allowed to stabilize before the next ingredient 210, 212, or 214 is added to the blending chamber 128.

In a plurality of recipe pulse sequences 400, not every ingredient 210/212/214 may be dispensed and/or the predetermined time period for each ingredient 210/212/214 dispensed may vary. Additionally, the food product pressure stabilization time period 408 can be the same between transitions to different ingredients or different, as may be required and/or desired in a particular embodiment.

In an exemplary embodiment, in reference 'D' there is illustrated a pressure 804 versus time 804 chart. In operation, as ingredients 210, 212, or 214 are blended by way of the recipe pulse sequence in the blending chamber 128, conveyed, and injected into the mixing cylinder 536 pressure sensor 106D will begin to record an increase in food product pressure 806. When the food product pressure 806 reaches the desired predetermined food product pressure 808 then the blending process is stopped until the food product pressure 806 falls below the desired predetermined food product pressure 808 at which point the recipe pulse sequence is restarted to refill the mixing cylinder 536 with food product 208 raising the food product pressure 806 until the desired food product pressure 808 is reached again. In this regard, the mixing cylinder 526 is maintained full of food product 208 at the desired predetermined food product pressure 808 which maintains product quality and better insures that when dispensed by user 302 or customer 304 for consumption purposes the food product 208 frozen malleable consistency is at an ideal viscosity.

In the present invention "ideal consistency" or "ideal viscosity" is related to food product 208 viscosity and intended to mean the predetermined frozen malleable consistency of the food product 208 which can be easily dispensed from the dispense valve 548 yet frozen enough to be non-runny and user 302 and/or customer 304 desirable for consumption. In this regard, the predetermined frozen malleable consistency can be selected by user 302 by configuring the frozen beverage equipment 602 and softserve ice cream equipment 604 and maintaining food product pressure 806 within the mixing cylinder 536 at the desired predetermined food product pressure 808.

Figure 10B:
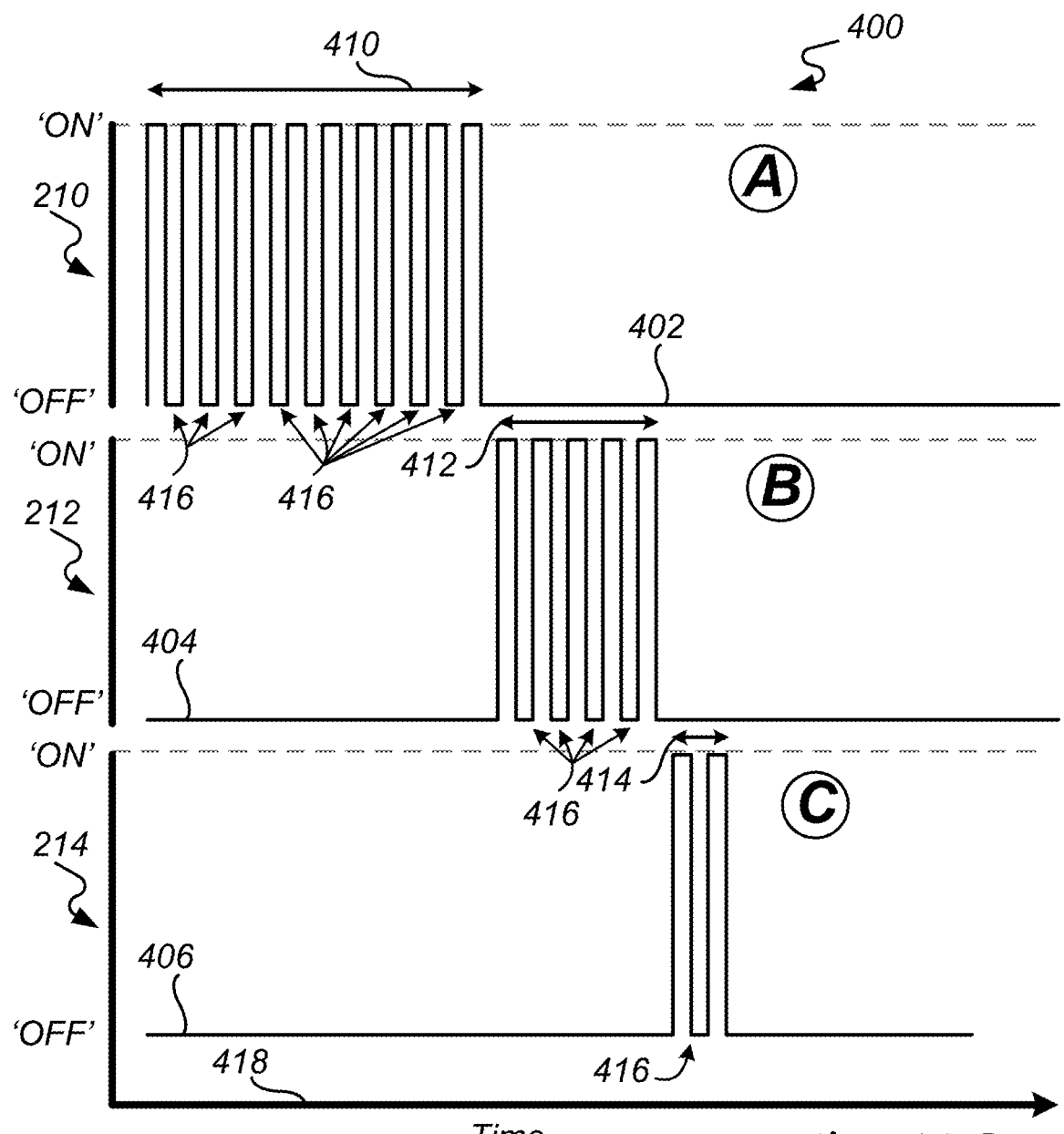

Referring to FIG. 10B, there is illustrated a recipe pulse sequence 400. The recipe pulse sequence 400 can be represented as a square wave 402/404/406 that indicates a time period 418 that an electronic valve 110A-C/112A-C is energized 'ON' or 'OPEN' 410/412/414 to allow ingredient flow or in standby 'OFF' or "CLOSED" abating ingredient 210/212/214 flow.

In an exemplary embodiment, a resting pulse period 416 can be integrated into the electronic valve 110A-C/112A-C energized 'ON' or 'OPEN' time periods 410/412/414. In this regard, the electronic valve 110A-C/112A-C energized 'ON' or 'OPEN' the ingredient 210/212/214 supply-side pressure can drop, and as a result inaccuracies in pumping or otherwise metering product amounts into the blending chamber 128 can occur. To allow ingredient 210/212/214 supply-side pressure to recover and the pressure reservoirs 126A-C to be refilled during an ingredient 210/212/214 injection into the blending chamber 128 thus maintaining a more stable ingredient 210/212/214 pressure during metering into the blending chamber 128 a resting pressure period 416 can be integrated into the electronic valve 110A-C/112A-C energized 'ON' or 'OPEN' time periods 410/412/414. In operation, the electronic valve 110A-C/112A-C energized 'ON' or 'OPEN' and 'OFF' or 'CLOSED' several times within the time periods 410/412/414. The 'OFF' or 'CLOSED' resting pulse period 416 allows the ingredient 210/212/214 pumps/metering devices 550/552/554 to recover and repressurize the ingredient 210/212/214 supply lines and refill the pressure reservoirs 126A-C.

In an exemplary embodiment, such resting pulse period 416 can be predetermined and set to occur each time an ingredient 210/212/214 is need to be injected into the blending chamber 128. In other exemplary embodiments, the pressure of each ingredient can be measured by way of pressure sensor 106A-D and the resting pulse period 416 inserted into the electronic valve 110A-C/112A-C energized 'ON' or 'OPEN' time periods 410 in reference 'A', 412 in reference 'B', and 414 in reference 'C' when the ingredient pressure 210, 212, or 214 respectively falls below a predetermined ingredient pressure level as measure by the pressure sensors 106A-C. The frequency and time period of the resting pulse period can also be dynamically determined based on pressure sensor 106A-C readings during ingredient 210/212/214 injection into the blending chamber 128.

In an exemplary embodiment, the recipe pulse pattern 400 square waves 402/404/406 resting pulse periods 416 for each of the electronic valve 110A-C/112A-C energized 'ON' or 'OPEN' time periods 410/412/414 can be dynamically machine-learned over time by correlating the pressure sensor 106A-C reading during ingredient 210/21/214 injection into the blending chamber over many mixing chamber 536 refills and for different recipe pulse patterns 400 and different ingredients 210/212/214, as may be required and/or desired in a particular embodiment.

In an exemplary embodiment, in operation, the memory 504 can be encoded with instructions that when executed by the microcontroller 502 perform the steps of inserting one or more of a resting pulse period 416 into the recipe pulse sequence 400 turning 'OFF' or 'CLOSING' the electronic valve 110A-C/112A-C. And, allowing during the resting pulse period 416 the pressure reservoir 126A-C to repressurize before turning the electronic valve 110A-C/112A-C back 'ON' or 'OPENING'.

Figure 10C:
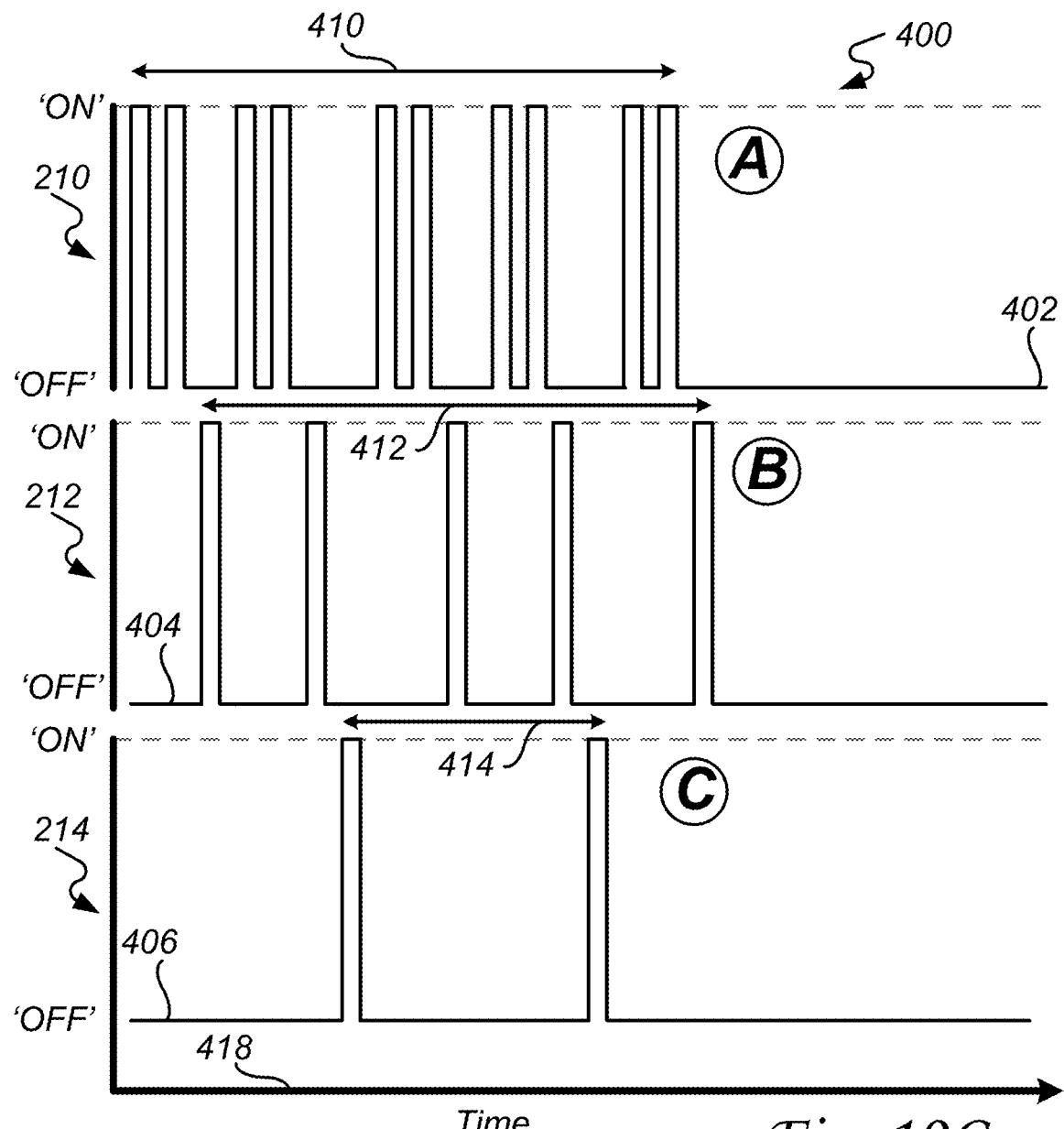
FIG. 10C illustrates one example of a subdivided recipe pulse sequence.

Referring to FIG. 10C, there is illustrated a recipe pulse sequence 400. The recipe pulse sequence 400 can be represented as a square wave 402/404/406 that indicates a time period 418 that an electronic valve 110A-C/112A-C is energized 'ON' or 'OPEN' 410/412/414 to allow ingredient 210/212/214 flow or in standby 'OFF' or "CLOSED" abating ingredient 210/212/214 flow.

In the present invention, the term "micro-blending" is intended to mean interspersing small portions of the ingredient 210/212/214 together in the blending chamber 128, increasing the surface area that each ingredient 210/212/214 is contacting each other ingredient 210/212/214.

In an exemplary embodiment, the mixing cylinder 536 can be filled with the food product 208 by dividing the recipe pulse sequence 400 into a subdivided recipe pulse sequence. The subdivided recipe pulse sequence can then be used to activate the electronic valve 110A-C/112A-C. The food product pressure 806 can be monitored by way of a pressure sensor 106D until the predetermined food product pressure 808 is reached. In this regard, the ingredients 202/204/206 are micro-blended in the blending chamber 128 to form the food product 208.

As an example, and not a limitation, with reference to FIG. 10C, in reference 'A' the recipe pulse sequence 400 is energizing 'ON' or 'OPEN' 410 electronic valve 110A/112A for ingredient 10 ten times, and in reference 'B' energizing 'ON' or 'OPEN' 412 electronic valve 110B/112B for ingredient 212 five times, and in reference 'C' energizing 'ON' or 'OPEN' 414 electronic valve 110C/112C for ingredient 214 two times.

Instead of operating the recipe pulse sequence 400, as illustrated in FIG. 10A, in a serial manner where 410 is initiated and completed, then 214 is initiated and completed, and then 414 is initiated and completed, the recipe pulse sequence 400 is subdivided and operated in a parallel manner. In this regard, in reference 'A' a portion of sequence 410 is completed and then in reference 'B' a portion of sequence 412 is completed, and then in reference 'A' a portion of sequence 414 is completed, repeating until the complete recipe pulse sequence 400 is completed. In this manner, a recipe pulse sequence 400 with:

10 pulses of 210/410 followed by;
8 pulses of 212/412 followed by;
2 pulses of 214/414;
can be transformed into a subdivided recipe pulse sequence 400 of:
2 pulses of 210/410 followed by;
1 pulse of 212/412 followed by;
2 pulses of 210/410 followed by;
1 pulse of 212/412 followed by;
1 pulse of 214/414 followed by;
2 pulses of 210/410 followed by;
1 pulse of 212/412 followed by;
2 pulses of 210/410 followed by;
1 pulse of 212/412 followed by;
1 pulse of 214/414 followed by;
2 pulses of 210/410 followed by;
1 pulse of 212/412.

An advantage in the present invention is that by converting a recipe pulse sequence 400 into a subdivided recipe pulse sequence 400 the ingredients are micro-blended by interspersing smaller portions of the ingredient 210/212/214 together in blending chamber 128. Such a subdivided recipe pulse sequence 400 micro-blending technique can create more surface area for the ingredients to contact each other which can promote things like better diffusion of gasses into the food product 208. Such better diffusion can aid in carbonation, and other aspects of gas mixing including dissolving, imbibing, entraining, and other gas-liquid interactions. Such other micro-blending advantages can include flavor dispersion, more rapid chilling and stirring once in the mixing cylinder 536, and other micro-blending advantages.

Figures 11, 12:
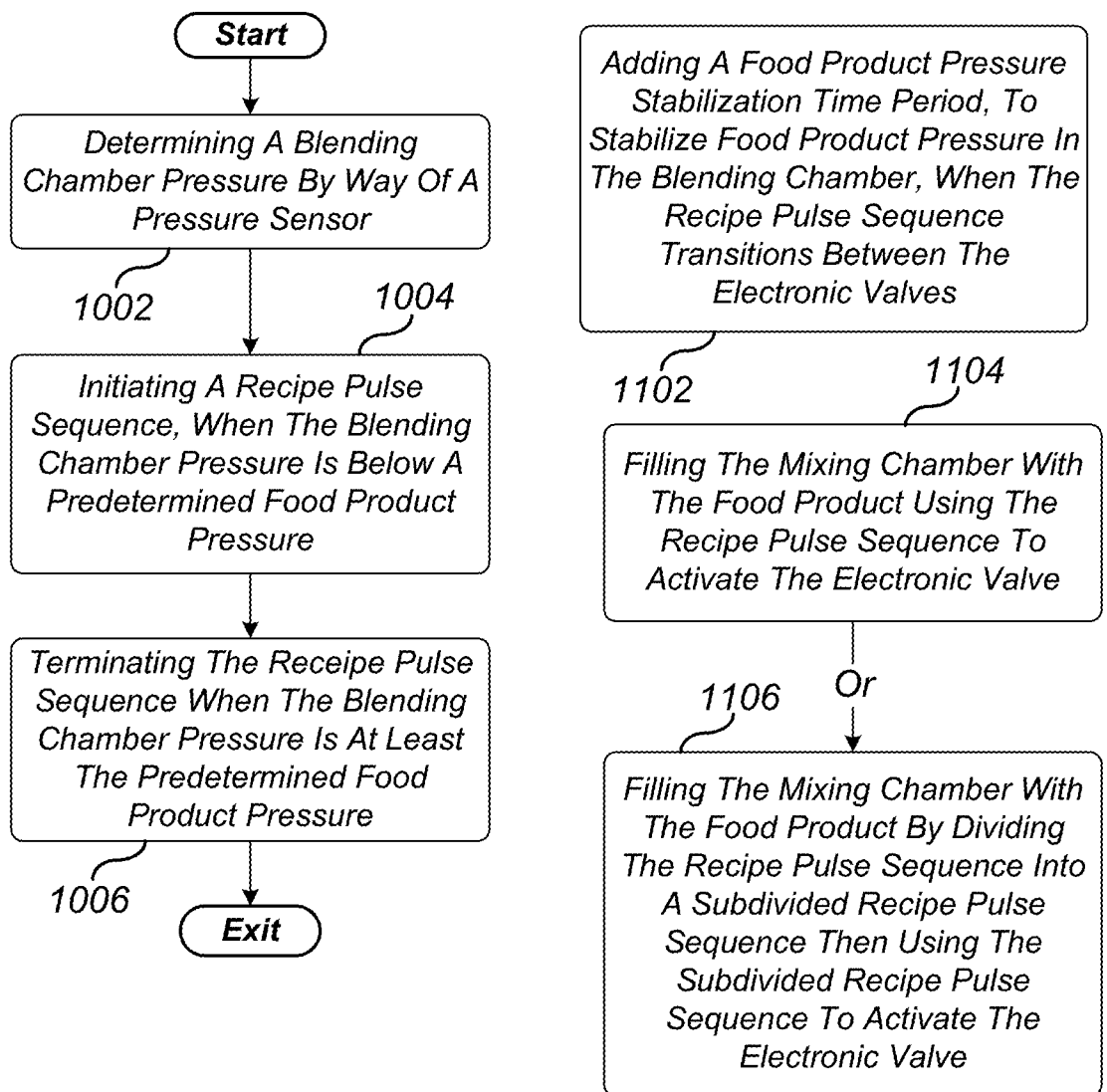
FIG. 11 illustrates one example of an ingredient blending method.
FIGS. 12-13 illustrates exemplary embodiments that can interchangeably be used with the methods of the present invention.

Referring to FIG. 11, there is illustrated one example of an ingredient blending method. In an exemplary embodiment, an ingredient blending method for use in frozen beverage equipment 602 and soft-serve ice cream equipment 604 begins in step 1002.

In step 1002, a food product pressure 806 is determined by way of a pressure sensor 106A-C. A manifold body 108 has at least one blending chamber 128, a front side, a backside, and a top side. The top side has more than one ingredient inlet port 130/132/134. The backside has more than one pressure reservoir 126A-D. The front side has more than one ingredient egress port 120A-C that intersects the pressure reservoirs 126A-C and more than one ingredient ingress port 122A-C that intersects the blending chamber 128.

More than one inlet conduit 120A-C can be fastened to each of the ingredient inlet ports 130/132/134. An ingredient supply line 210/212/214 can be interconnected with the inlet conduit 120A-C and supplies one or more of an ingredient 202/204/206 by injecting the ingredient 202/204/206 into the manifold body 108 through the ingredient inlet port 130/132/134.

More than one of the pressure sensors 106A-D can be secured within each of the pressure reservoirs 126A-D. The ingredient inlet port 130/132/134 intersects the pressure reservoirs 126A-C allowing the ingredients 210/212/214 to enter the pressure reservoirs 126A-C. The blending chamber 128 can intersect at least one of the pressure sensor reservoirs.

More than one electronic valve 110A-C/120A-C can be secured to the front side of the manifold body 108 such that when the electronic valve 110A-C/112A-C is in the 'ON or 'OPEN' position the ingredient 210/212/214 passes from the pressure reservoir 126A-C out of the ingredient egress port 120A-C, along the front side of the manifold body 108 under the electronic valve 110A-C/112A-C, through the ingredient ingress port 122A-C, and into the blending chamber 128 forming a food product 208. And, when the electronic valve 110A-C/112A-C is in the 'OFF' or 'CLOSED' position the ingredient 210/212/214 is prevented from egressing from the pressure reservoir 126A-C through the ingredient egress port 120A-C. At least one food product egress conduit 104 is fastened to the blending chamber 128 through which the food product 208 egresses the manifold body 108. The method then moves to step 1004.

In step 1004, a recipe pulse sequence 400 is initiated when the food product pressure 806 is below a predetermined food product pressure 808. The recipe pulse sequence 400 operates the electronic valves 110A-C/112A-C in an 'ON' or 'OPEN' and 'OFF' or 'CLOSED' manner in a predetermined sequence allowing predetermined portions of the ingredients 210/212/206 to enter the blending chamber 128. The method then moves to step 1006.

In step 1006, the recipe pulse sequence 400 is terminated when the food product pressure 806 is at least the predetermined food product pressure 808. The method is then exited.

In an exemplary embodiment, in operation, a mixing cylinder 536 is interconnected to the food product egress conduit 104 and receives the food product 208. The mixing cylinder 536 comprises an auger 534 for circulating the food product 208 within the mixing cylinder 536 and a dispense valve 548 for dispensing the food product 208 from the mixing cylinder 536.

A control system 500 comprises a microcontroller 502, a memory 504, a valve controller 512 that is operationally related to the electronic valve 110A-C/112A-C, and a pressure sensor controller 560 that is operationally related to the pressure sensor 106A-D. The memory 504, the valve controller 512, and the pressure sensor controller 560 are operationally related to the microcontroller 502.

The memory 504 is encoded with instructions that when executed by the microcontroller 502 perform the steps of determining a food product pressure 806 by way of the pressure sensor 106D. Initiating a recipe pulse sequence 402/402/406, when the food product pressure 806 is below a predetermined food product pressure 808. The recipe pulse sequence 402/404/406 operating the electronic valves 110A-C/112A-C in an 'ON' and 'OFF' manner in a predetermined sequence allowing a predetermined portion of the ingredients 210/212/214 to enter the blending chamber 128. And terminating the recipe pulse sequence 402/404/406 when the food product pressure 806 is at least the predetermined food product pressure 808.

Referring to FIG. 12, there are illustrated exemplary embodiments that can interchangeably be used with the methods of the present invention.

In step 1102, a food product pressure stabilization time period 408 is added to the to the recipe pulse sequence 400, to stabilize food product pressure 806 in the blending chamber 128, when the recipe pulse sequence 400 transitions between one or more of the electronic valve 110A-C/112A-C. In this regard, the food product pressure 806 is allowed to stabilize before the next one or more of the ingredients 210/212/214 are added to the blending chamber 128.

The ingredient blending method can transition between steps 1104 and 1106. In step 1104, the mixing cylinder 536 is filled with food product 208 using the recipe pulse sequence 400 to activate the electronic valves 110A-C/112A-C and monitor the food product pressure 806 until the predetermined food product pressure 808 is reached. Or, in step 1106 the mixing cylinder 536 is filled with the food product 208 by dividing the recipe pulse sequence 400 into a subdivided recipe pulse sequence as better illustrated in at least FIG. 10C. The subdivided recipe pulse sequence is then used to activate the electronic valve 110A-C/112A-C and monitor the food product pressure 806 until the predetermined food product pressure 808 is reached. In this regard, micro-blending of the ingredients 210/212/214 is improved.

Figure 13:
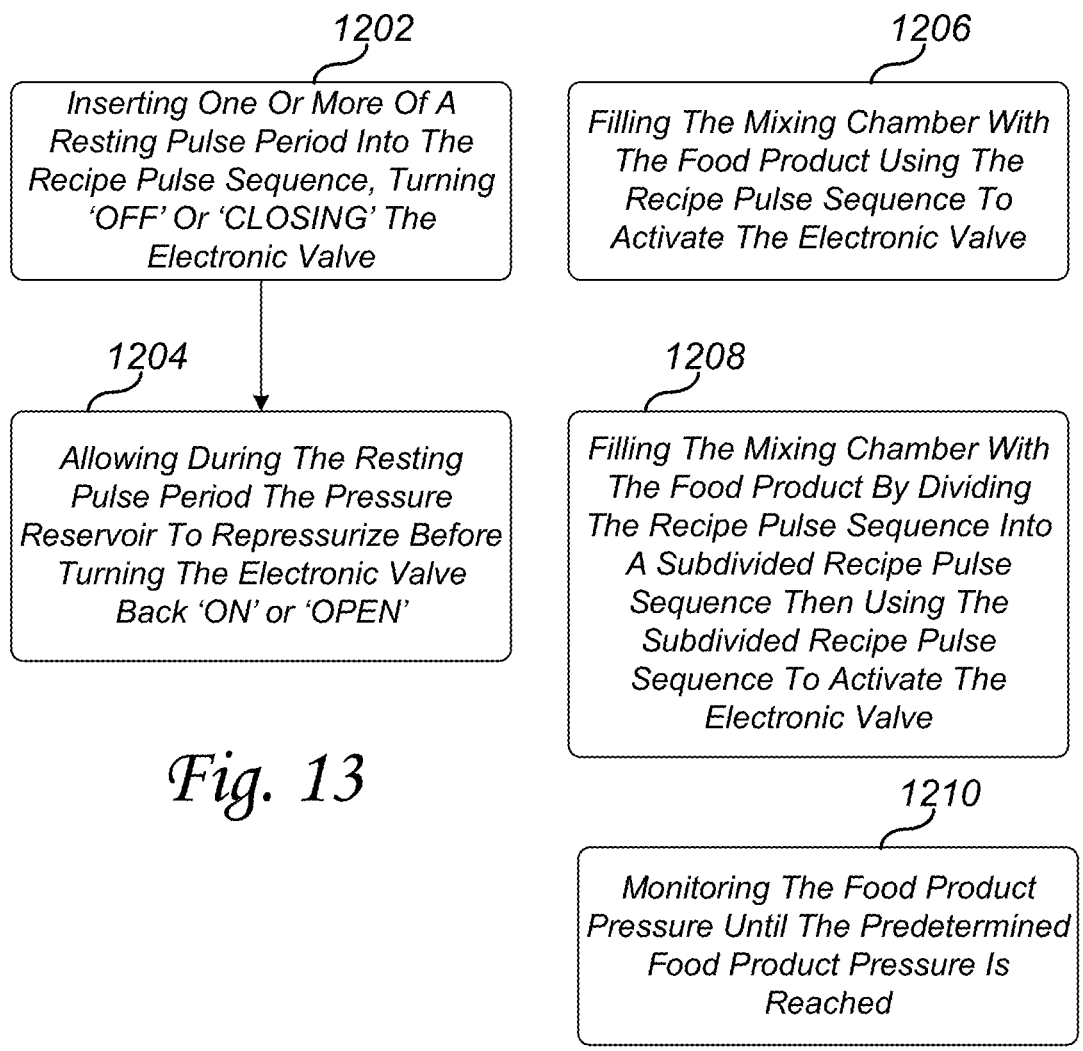

Referring to FIG. 13, there is illustrated an exemplary embodiment that can interchangeably be used with the methods of the present invention. The ingredient blending method performs steps 1202 and 1204. In step 1202, one or more of a resting pulse period 416 can be inserted into the recipe pulse sequence 400 turning 'OFF' or 'CLOSING' the electronic valve 110A-C/112A-C. And in step 1204, during the resting pulse period 416 the pressure reservoir 126A-C is allowed to repressurize before turning the electronic valve 110A-C/112A-C back 'ON' or 'OPENING. Such resting pulse period 416 can range from millisecond to seconds depending on how quickly after electronic valve 110A-C/112A-C 'OFF" or 'CLOSING' the pressure reservoir 126A-C repressurizes.

In step 1206, the mixing cylinder 536 is filled with food product 208 using the recipe pulse sequence 400 to activate the electronic valves 110A-C/112A-C and monitor the food product pressure 806 until the predetermined food product pressure 808 is reached.

In step 1208, the mixing cylinder 536 is filled with the food product 208 by dividing the recipe pulse sequence 400 into a subdivided recipe pulse sequence as better illustrated in at least FIG. 10C. The subdivided recipe pulse sequence is then used to activate the electronic valve 110A-C/112A-C and monitor the food product pressure 806 until the predetermined food product pressure 808 is reached. In this regard, micro-blending of the ingredients 210/212/214 is improved.

In step 1210, the food product pressure is monitored until the predetermined food product pressure is reached or otherwise achieved.

The capabilities of the present invention can be implemented in software, firmware, hardware, or some combination thereof.

As one example, one or more aspects of the present invention can be included in an article of manufacture (e.g., one or more computer program products) having, for instance, computer usable media. The media has embodied therein, for instance, computer-readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

While the preferred embodiment of the invention has been described, it will be understood that those skilled in the art, both now and in the future, may make various improvements and enhancements which fall within the scope of the claims which follow. These claims should be construed to maintain the proper protection for the invention first described.

What is claimed is:

1. An ingredient blending system for use in frozen beverage equipment and soft-serve ice cream equipment, the ingredient blending system comprising:

a manifold body having at least one of a blending chamber, a front side, a backside, and a top side, the top side having a plurality of ingredient inlet ports, the backside having a plurality of pressure reservoirs, the front side having a plurality of ingredient egress ports, each of the plurality of ingredient egress ports intersect at least one of the plurality of pressure reservoirs, and a plurality of ingredient ingress ports intersect the blending chamber;

a plurality inlet conduits, at least one of the plurality of inlet conduits is fastened to each of the plurality of ingredient inlet ports, wherein a plurality of ingredient supply lines is interconnected with one or more of the plurality of inlet conduits and supplies a plurality of ingredients by injecting at least one of the plurality of ingredients into the manifold body through at least one of the plurality of ingredient inlet ports;

a plurality of pressure sensors, at least one of the pressure sensors is secured within each of the plurality of pressure reservoirs, at least one of the plurality of ingredient inlet ports intersects at least one of the plurality of pressure reservoirs allowing at least one of the plurality of ingredients to enter at least one of the plurality of pressure reservoirs, the blending chamber intersects at least one of the pressure sensor reservoirs;

a plurality of electronic valves, at least one of electronic valves is secured to the front side of the manifold body such that when a selected one of the plurality of electronic valves is in the on or open position, a corresponding at least one of the plurality of ingredients passes, from a corresponding at least one of the plurality of pressure reservoirs, out of a corresponding at least one of the plurality of ingredient egress ports, through a corresponding at least one of the plurality of ingredient ingress ports, and into the blending chamber forming a food product, and when a selected one of the plurality of electronic valves is in the off or closed position, a corresponding at least one the plurality of ingredients is prevented from egressing, from a corresponding at least one of the plurality of pressure reservoirs, through a corresponding at least one of the plurality of ingredient egress ports; and at least one of a food product egress conduit is fastened to the blending chamber through which the food product egresses the manifold body.

2. The ingredient blending system in accordance with claim 1, wherein the plurality of ingredients traverse along the surface of the front side between the plurality of ingredient egress ports and the plurality of ingredient ingress ports contained within an ingredient transfer void that is temporarily created when one or more of the plurality of electronic valves is opened.

3. The ingredient blending system in accordance with claim 1, wherein the manifold body has a bottom side, the bottom side having at least one of a mounting hole for receiving a fastener that secures the manifold body in place within frozen beverage equipment or soft-serve ice cream equipment.

4. The ingredient blending system in accordance with claim 1, further comprising:
a food portion is one of the plurality of ingredients and is interconnected by way of the plurality of ingredient supply lines with at least one of the plurality of inlet conduits; and
a gas portion is one of the plurality of ingredients and is interconnected by way of the plurality of ingredient supply lines with at least one of the plurality of inlet conduits, the food product comprises the gas portion and the food portion.

5. The ingredient blending system in accordance with claim 1, further comprising:
a water portion is one of the plurality of ingredients and is interconnected by way of the plurality of ingredient supply lines with at least one of the plurality of inlet conduits, the food product comprises the water portion.

6. The ingredient blending system in accordance with claim 1, further comprising:
a clean-in-place liquid is interconnected with at least one of the plurality of inlet conduits, wherein the ingredient blending system is cleaned by injecting the clean-in-place liquid.

7. The ingredient blending system in accordance with claim 1, further comprising:
a mixing cylinder that is interconnected to the plurality of food product egress conduits and that receives the food product, the mixing cylinder comprises an auger for circulating the food product within the mixing cylinder and a dispense valve for dispensing the food product from the mixing cylinder;
a control system comprising a microcontroller, a memory, a valve controller that is operationally related to the plurality of electronic valves, and a pressure sensor controller that is operationally related to the plurality of pressure sensors, the memory, the valve controller, and the pressure sensor controller are operationally related to the microcontroller, the memory is encoded with instructions that when executed by the microcontroller perform the steps of:
determining a food product pressure by way of the plurality of pressure sensors;
initiating a recipe pulse sequence, when the food product pressure is below a predetermined food product pressure, the recipe pulse sequence selectively operates at least one of the plurality of electronic valves in an on or open and off or closed manner in a predetermined sequence allowing a predetermined portion of the plurality of ingredients to enter the blending chamber; and
terminating the recipe pulse sequence when the food product pressure is at least the predetermined food product pressure.

8. The ingredient blending system in accordance with claim 7, wherein the memory is encoded with instructions that when executed by the microcontroller perform the step of:
adding a food product pressure stabilization time period to the recipe pulse sequence when the recipe pulse sequence transitions between the plurality of electronic valves, wherein the food product pressure is allowed to stabilize before next one or more of the plurality of ingredients is added to the blending chamber.

9. The ingredient blending system in accordance with claim 7, wherein the memory is encoded with instructions that when executed by the microcontroller performs the steps of:
filling the mixing cylinder with the food product using the recipe pulse sequence to selectively activate at least one of the plurality of electronic valves; and
monitoring the food product pressure until the predetermined food product pressure is reached.

10. The ingredient blending system in accordance with claim 7, wherein the memory is encoded with instructions that when executed by the microcontroller performs the steps of:
filling the mixing cylinder with the food product by dividing the recipe pulse sequence into a subdivided recipe pulse sequence, then using the subdivided recipe pulse sequence to selectively activate at least one of the plurality of electronic valves; and
monitoring the food product pressure until the predetermined food product pressure is reached, wherein micro-blending of the plurality of ingredients is improved.

11. The ingredient blending system in accordance with claim 7, wherein the memory is encoded with instructions that when executed by the microcontroller performs the steps of:
inserting one or more of a resting pulse period into the recipe pulse sequence turning off or closing the plurality of electronic valves; and
allowing during the resting pulse period the pressure reservoir to repressurize before turning one more of the plurality of electronic valves back on or open.

12. The ingredient blending system in accordance with claim 1, further comprising:
a control system comprising a microcontroller, a memory, a valve controller that is operationally related to the plurality of electronic valves, and a pressure sensor controller that is operationally related to the plurality of pressure sensors, the memory, the valve controller, and the pressure sensor controller are operationally related to the microcontroller, the memory is encoded with instructions that when executed by the microcontroller perform the steps of:
determining a food product pressure by way of the pressure sensors;
initiating a recipe pulse sequence, when the food product pressure is below a predetermined food product pressure, the recipe pulse sequence selectively operates at least one of the plurality of electronic valves in an on or open and off or closed manner in predetermined sequence allowing predetermined portion of the plurality of ingredients to enter the blending chamber; and
terminating the recipe pulse sequence when the food product pressure is at least the predetermined food product pressure.

13. The ingredient blending system in accordance with claim 12, wherein the memory is encoded with instructions that when executed by the microcontroller perform the steps of:

dividing the recipe pulse sequence into a subdivided recipe pulse sequence, then using the subdivided recipe pulse sequence to selectively activate at least one of the plurality of electronic valves; and monitoring the food product pressure until the predetermined food product pressure is reached, wherein micro-blending of the plurality of ingredients is improved.

14. The ingredient blending system in accordance with claim 12, wherein the plurality of ingredients traverse along the surface of the front side between the plurality of ingredient egress ports and the plurality of ingredient ingress ports contained within an ingredient transfer void that is temporarily created when one or more of the plurality of electronic valves is opened.

15. The ingredient blending system in accordance with claim 12, further comprising:
   a food portion is one of the plurality of ingredients and is interconnected by way of the ingredient supply lines with at least one of the inlet conduit; and
   a gas portion is one of the plurality of ingredients and is interconnected by way of the ingredient supply lines with at least one of the inlet conduit, the food product comprises the gas portion and the food portion.

16. A method of using the ingredient blending system of claim 1, the method comprising the steps of:
   determining a food product pressure by way of a pressure sensor;
   initiating a recipe pulse sequence when the food product pressure is below a predetermined food product pressure, the recipe pulse sequence operating the plurality of electronic valves in an on or open and off or closed manner, in predetermined sequence, allowing predetermined portion of the plurality of ingredients to enter the blending chamber; and
   terminating the recipe pulse sequence when the food product pressure is at least the predetermined food product pressure.

17. The ingredient blending method in accordance with claim 16, further comprising the step of:
   adding a food product pressure stabilization time period to the recipe pulse sequence, when the recipe pulse sequence transitions between the plurality of electronic valves, wherein the food product pressure is allowed to stabilize before next one or more of the plurality of ingredients is added to the blending chamber.

18. The ingredient blending method in accordance with claim 16, further comprising the steps of:
   filling the mixing cylinder with the food product using the recipe pulse sequence to selectively activate at least one of the plurality of electronic valves; and
   monitoring the food product pressure until the predetermined food product pressure is reached.

19. The ingredient blending method in accordance with claim 16, further comprising the steps of:
   filling the mixing cylinder with the food product by dividing the recipe pulse sequence into a subdivided recipe pulse sequence, then using the subdivided recipe pulse sequence to selectively activate at least one of the plurality of electronic valves; and
   monitoring the food product pressure until the predetermined food product pressure is reached, wherein micro-blending of the plurality of ingredients is improved.

20. The ingredient blending method in accordance with claim 16, further comprising transitioning between the steps of:
   inserting one or more of a resting pulse period into the recipe pulse sequence turning off or closing the plurality of electronic valves; and
   allowing during the resting pulse period the pressure reservoir to repressurize before turning at least one of the plurality of electronic valves back on or opening.

* * * * *